US011134472B2

(12) United States Patent
Hoang et al.

(10) Patent No.: US 11,134,472 B2
(45) Date of Patent: Sep. 28, 2021

(54) RESOURCE POOL SHARING BETWEEN NETWORK SCHEDULED UE AND AUTONOMOUS SCHEDULED UE TRANSMISSIONS

(71) Applicant: IDAC Holdings, Inc., Wilmington, DE (US)

(72) Inventors: Tuong Duc Hoang, Montreal (CA); Tao Deng, Roslyn, NY (US); Martino M. Freda, Laval (CA); Aata El Hamss, Montreal (CA); Benoit Pelletier, Roxboro (CA)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/372,949

(22) Filed: Apr. 2, 2019

(65) Prior Publication Data

US 2019/0306835 A1 Oct. 3, 2019

Related U.S. Application Data

(60) Provisional application No. 62/715,404, filed on Aug. 7, 2018, provisional application No. 62/668,536, filed (Continued)

(51) Int. Cl.
*H04W 72/02* (2009.01)
*H04W 72/04* (2009.01)
(Continued)

(52) U.S. Cl.
CPC ....... *H04W 72/02* (2013.01); *H04W 72/0406* (2013.01); *H04W 72/0493* (2013.01); *H04W 72/082* (2013.01); *H04W 92/18* (2013.01)

(58) Field of Classification Search
CPC ............. H04W 72/02; H04W 72/0406; H04W 72/0493; H04W 72/082
See application file for complete search history.

(56) References Cited

U.S. PATENT DOCUMENTS

2015/0215903 A1\* 7/2015 Zhao ................... H04W 56/002
370/329
2015/0334760 A1\* 11/2015 Sartori ................. H04W 76/10
370/329

(Continued)

OTHER PUBLICATIONS

NTT Docomo, Inc.; "Further details of UE autonomous resource (re)selection for V2V"; 3GPP TSG RAN WG1 Meeting #86 Gothenburg, Sweden Aug. 22-26, 2016; R1-167355 (Year: 2016).\*

(Continued)

*Primary Examiner* — Gary Mui
(74) *Attorney, Agent, or Firm* — Condo Roccia Koptiw LLP

(57) ABSTRACT

A wireless transmit/receive unit (WTRU) operating in an autonomous-scheduled mode may select a first resource from a resource pool. The WTRU may determine that the first resource is reserved for at least one sidelink transmission scheduled via a network-scheduled mode. The WTRU may evaluate the availability of resources in the resource pool based on determining that the first resource is reserved for the sidelink transmission. The WTRU may determine that a resource is available based on a measurement comparison to one or more thresholds. For example, there may be a first threshold for resources reserved by WTRUs operating using the network-scheduled mode and a second threshold for resources reserved by WTRUs operating using the autonomous-scheduled mode. The first threshold may be determined based on the second threshold and an offset value. The WTRU may reselect to a second resource in the resource pool based on the evaluated resource availability.

20 Claims, 15 Drawing Sheets

Related U.S. Application Data on May 8, 2018, provisional application No. 62/651,976, filed on Apr. 3, 2018.

(51) Int. Cl.
*H04W 72/08* (2009.01)
*H04W 92/18* (2009.01)

(56) References Cited

U.S. PATENT DOCUMENTS

| | | | | |
|---|---|---|---|---|
| 2016/0338094 | A1* | 11/2016 | Faurie | H04W 72/085 |
| 2017/0188391 | A1* | 6/2017 | Rajagopal | H04W 74/0816 |
| 2018/0249444 | A1* | 8/2018 | Sorrentino | H04W 72/02 |
| 2018/0359620 | A1* | 12/2018 | Zhao | H04W 4/46 |
| 2019/0045337 | A1* | 2/2019 | Sun | H04W 4/00 |
| 2019/0254059 | A1* | 8/2019 | Gulati | H04W 72/1263 |
| 2019/0394786 | A1* | 12/2019 | Parron | H04L 5/0044 |
| 2020/0107297 | A1* | 4/2020 | Wang | H04W 72/02 |
| 2020/0178217 | A1* | 6/2020 | Huang | H04W 80/02 |
| 2020/0196279 | A1* | 6/2020 | Thomas | H04W 72/04 |
| 2020/0374859 | A1* | 11/2020 | Han | H04W 72/042 |

OTHER PUBLICATIONS

Intel Corporation; "Sharing Resource Pool for eNB-controlled and UE-autonomous V2V Transmissions Modes"; 3GPP TSG RAN1 WG Meeting #88bis Spokane, USA, Apr. 3-7, 2017; R1-1704686 (Year: 2017).*

ZTE; "Considerations for shared resource pool between mode 3 and mode 4"; 3GPP TSG RAN WG1 Meeting #89 Hangzhou, P.R. China May 15-19, 2017; R1-1707213 (Year: 2017).*

CATT; "Discussion on resource pool sharing between mode 3 and mode 4"; 3GPP TSG RAN WG1 Meeting #89 Hangzhou, China May 15-19, 2017; R1-1707450 (Year: 2017).*

Ericsson; "Radio resource pool sharing between mode 3 and mode 4 UEs"; 3GPP TSG RAN WG1 Meeting #89 Hangzhou, China, May 15-19, 2017; R1-1708942 (Year: 2017).*

$3^{rd}$ Generation Partnership (3GPP), TS 22.185 V14.3.0, "$3^{rd}$ Generation Partnership Project; Technical Specification Group Services and System Aspects; Service requirements for V2X services; Stage 1 (Release 14)", Mar. 2017, 14 pages.

$3^{rd}$ Generation Partnership (3GPP), TS 22 36.213 V14.6.0, "$3^{rd}$ Generation Partnership Project, Technical Specification Group Radio Access Network Evolved Universal Terrestrial Radio Access (E-UTRA); Physical layer procedures (Release 14)", Mar. 2018, 466 pages.

3rd Generation Partnership Project (3GPP), R1-166511, "Sidelink Measurements for V2V Sensing and Resource Re-Selection Procedures", Intel Corporation, 3GPP TSG RAN WG1 Meeting #86, Gothenburg, Sweden, Aug. 22-26, 2016, pp. 1-5.

Molina-Masegosa et al., "LTE-V for Sidelink 5G V2X Vehicular Communications", IEEE Vehicular Technology Magazine, vol. 12, No. 4, Dec. 1, 2017, pp. 30-39.

3rd Generation Partnership Project (3GPP), R1-1707106, "Discussion on Resource Pool Sharing between Mode 3 and Mode 4", Xinwei, 3GPP TSG-RAN WG1 Meeting #89, Hangzhou, P. R. China, May 15-19, 2017, pp. 1-3.

* cited by examiner

RESOURCE POOL SHARING BETWEEN NETWORK SCHEDULED UE AND AUTONOMOUS SCHEDULED UE TRANSMISSIONS

CROSS-REFERENCE TO RELATED APPLICATIONS

This application claims the benefit of U.S. Provisional Application Ser. No. 62/651,976, filed Apr. 3, 2018, U.S. Provisional Application Ser. No. 62/668,536, filed May 8, 2018, and U.S. Provisional Application Ser. No. 62/715,404, filed Aug. 7, 2018, the contents of which are incorporated by reference herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities for resource pool sharing between network-scheduled wireless transmit/receive unit (WTRU) and autonomous-scheduled WTRU transmissions may be disclosed herein. A WTRU may be configured to operate in a first sidelink scheduling mode (e.g., a network-scheduled mode). For example, a network may select sidelink resources for sidelink transmissions by a WTRU operating in the first sidelink scheduling mode. A WTRU may be configured to operate in a second sidelink scheduling mode (e.g., an autonomous-scheduled mode). For example, a WTRU operating in the second sidelink scheduling mode may autonomously select sidelink resources for sidelink transmissions.

A WTRU may be configured to select a first resource from a resource pool. The WTRU may be operating in the second sidelink scheduling mode. The resource pool may be configured to be shared by WTRUs operating in the first sidelink scheduling mode and WTRUs operating in the second sidelink scheduling mode. The WTRU may transmit a first resource reservation message (e.g., via first SCI) indicating a forward booking of the first resource, for example after selecting the first resource. The WTRU may determine that the first resource is reserved for at least one sidelink transmission scheduled via the first sidelink scheduling mode. For example, the WTRU may determine that the first resource is reserved for at least one sidelink transmission scheduled via the first sidelink scheduling mode based on an indication (e.g., an explicit indication) received in SCI and/or by comparing the reference signal received power (RSRP) of the first resource to a threshold (e.g., a third threshold). For example, the WTRU may determine that the first resource is reserved for at least one sidelink transmission scheduled via the first sidelink scheduling mode if the RSRP of the first resource is higher than the threshold. The first resource may be reserved by, for example, another WTRU or the network. The WTRU may determine to reselect to a second resource in the resource pool.

The WTRU may evaluate the availability of resources in the resource pool based on determining that the first resource is reserved for the at least one sidelink transmission scheduled via the first sidelink scheduling mode. The WTRU may determine that a resource is available based on a measurement comparison to one or more thresholds. For example, there may be a first threshold for resources reserved by WTRUs operating using the first sidelink scheduling mode and a second threshold for resources reserved by WTRUs operating using the second sidelink scheduling mode. The measurement comparison may include comparing the RSRP of the resource to the first threshold or the second threshold. For example, the WTRU may determine that a resource reserved by a WTRU operating using the first sidelink scheduling mode is available if the RSRP of the resource is below the first threshold. The WTRU may determine that a resource reserved by a WTRU operating using the second sidelink scheduling mode is available if the RSRP of the resource is below the second threshold.

The WTRU may reselect to a second resource in the resource pool based on the evaluated resource availability. For example, there may be a set of available resources, and the WTRU may choose the second resource from the set of available resources. The WTRU may transmit a second resource reservation message (e.g., via second SCI) indicating a forward booking of the second resource, for example after selecting the second resource.

The first threshold may be determined based on the second threshold and an offset value. The second threshold and/or the offset value may be configured (e.g., preconfigured) in the WTRU and/or received from the network. The first threshold may be lower than the second threshold. For example, the offset value may be a negative value and may be added to the second threshold to generate the first threshold, or the offset value may be a non-negative value and may be subtracted from the second threshold to generate the first threshold.

A network scheduled wireless transmit/receive unit (WTRU) may report a sensing result to a network. The network scheduled WTRU may select the resource to perform sensing. An autonomously scheduled WTRU may perform resource selection and/or reselection based on a detection of network scheduled sidelink/V2X transmission. A WTRU may autonomously determine its scheduling mode (e.g., network vs. autonomous).

A network scheduled WTRU may prepare and/or send a periodic report and may prepare and/or send a difference report (e.g., delta) which may indicate the status of available resource from the last periodic report. The difference report may be event triggered. A network scheduled WTRU may perform reporting based on, for example, different selection of PPPP values. An autonomous scheduled WTRU may report its available resources based on sensing, for example after the WTRU performs resource selection.

A WTRU may evaluate a sensing result. For example, the WTRU may determine channel availability (e.g., the availability of one or more time and/or frequency resources) based on a sensing result. The WTRU may interpret results of a sensing event to determine whether a channel is available (e.g., able to be used for a transmission) or unavailable (e.g., unable to be used for a transmission). The WTRU may use a channel that it has determined to be available to transmit one or more scheduled packets. The WTRU may determine parameters for evaluating the sensing result, and may determine when to evaluate the sensing result. The WTRU may compare the result of a current sensing evaluation event with a result of a previous reporting event.

DETAILED DESCRIPTION

Figure 1A:
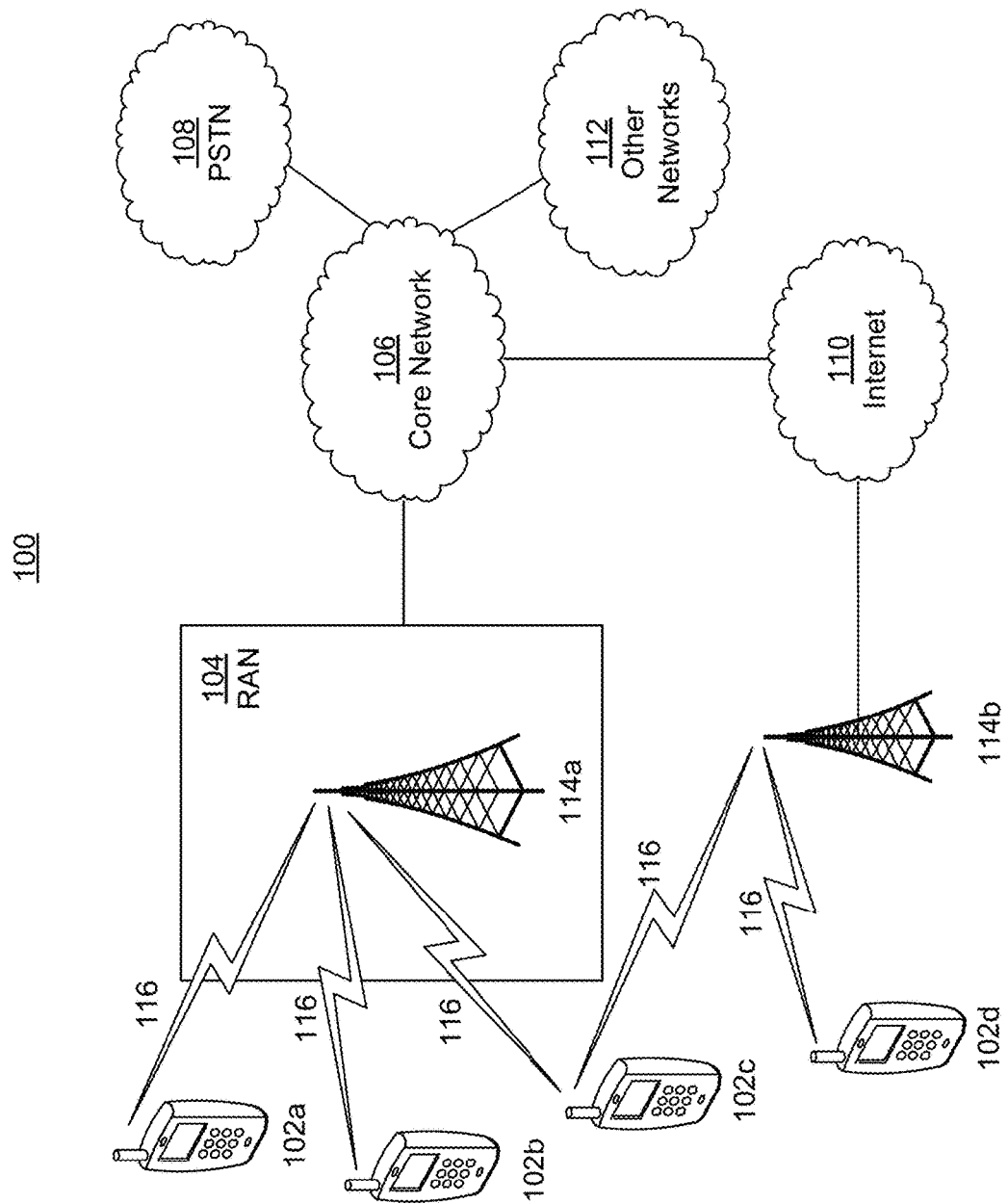
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
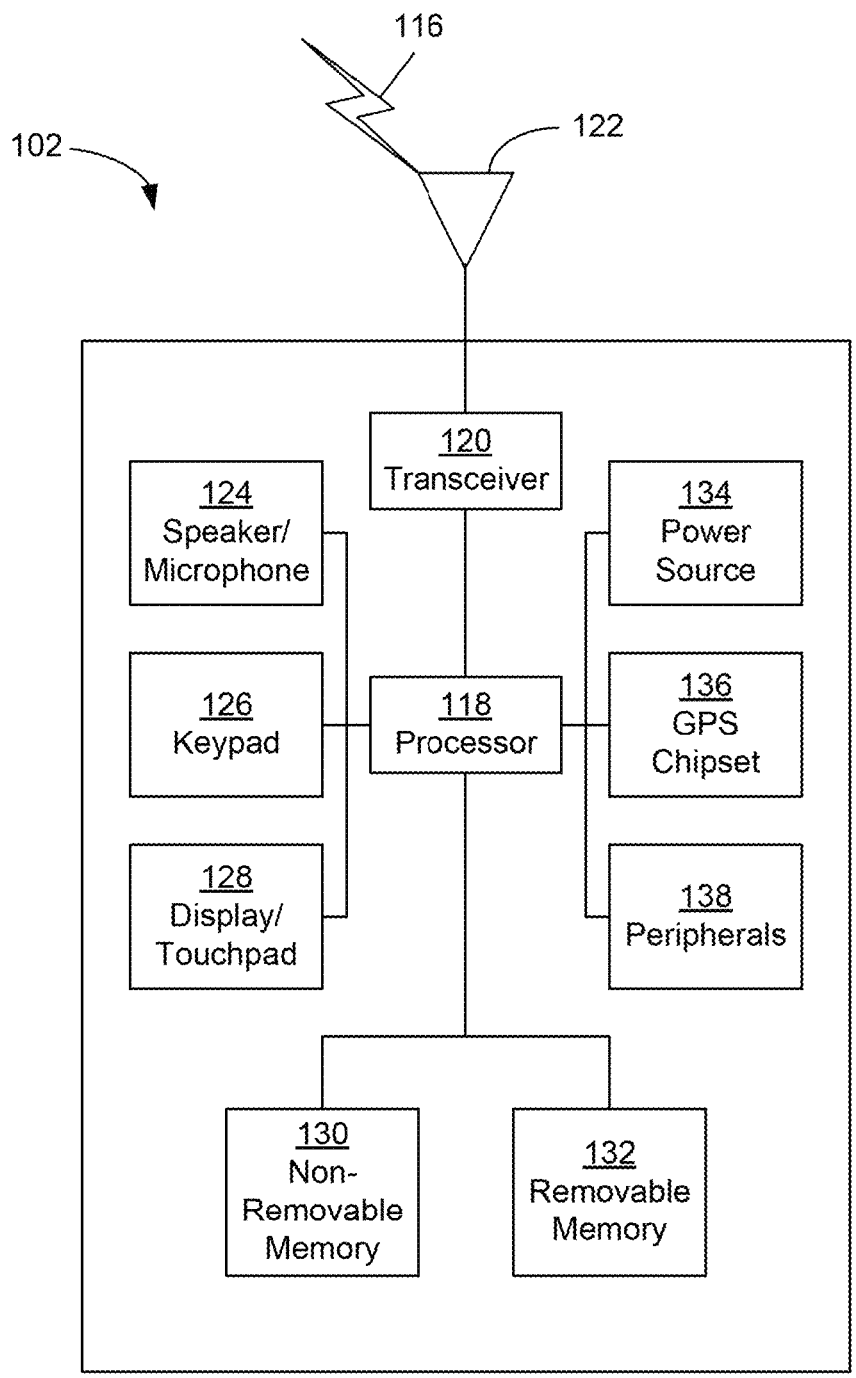
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
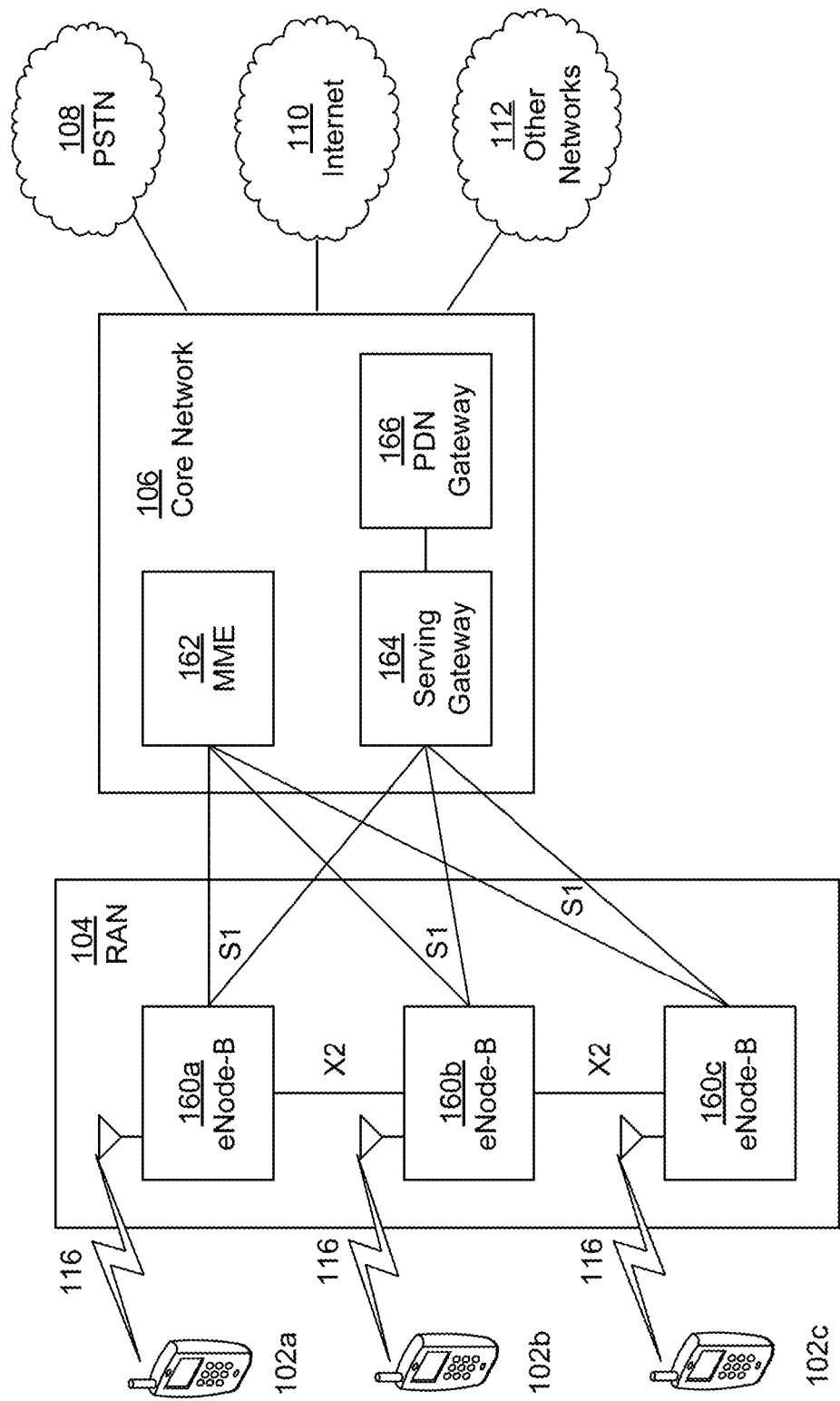
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
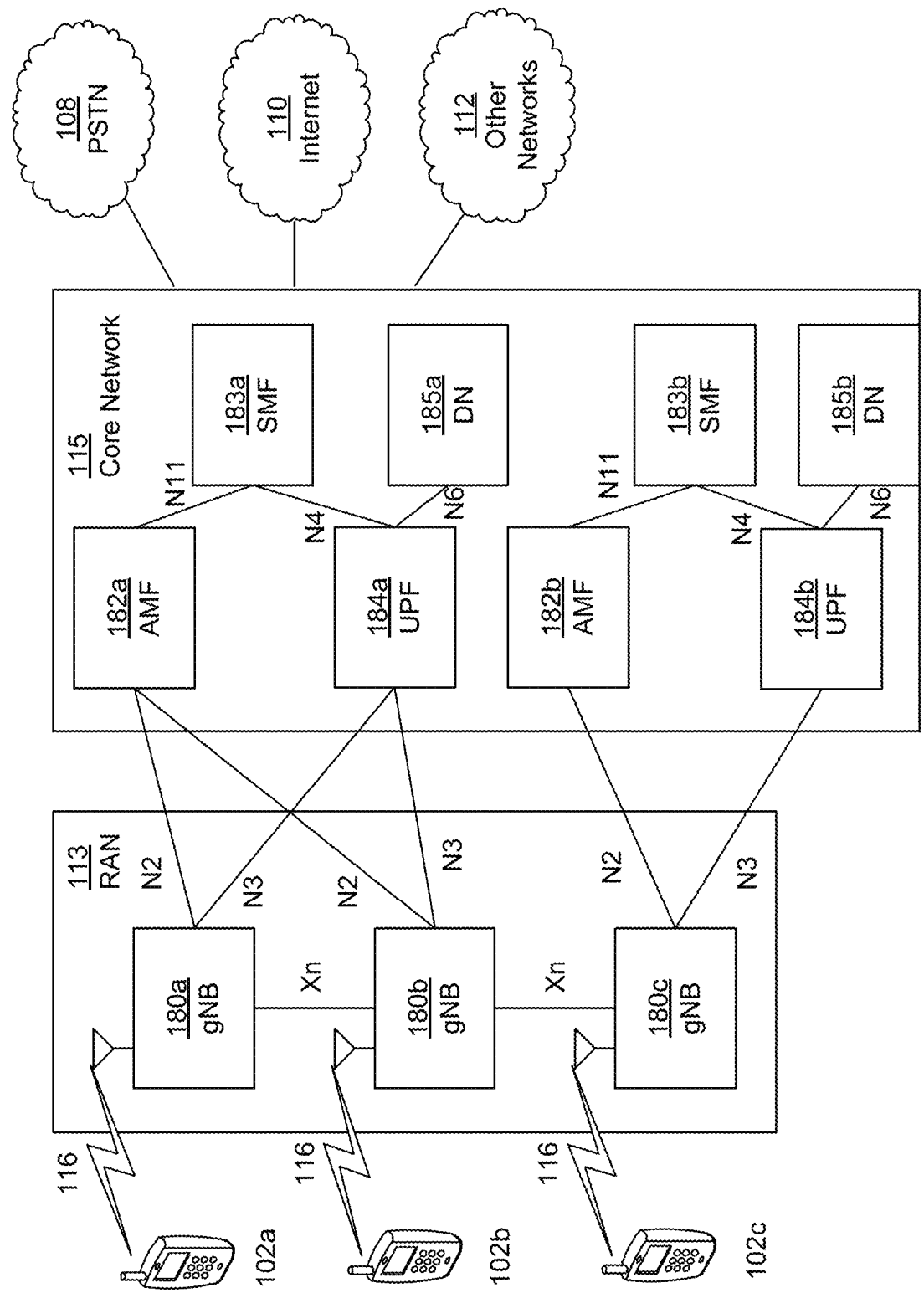
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In a vehicular to everything (V2X) communication system, two nearby vehicles may communicate to each other (e.g., directly) by a side link, for example without sending data to a network. A wireless transmit/receive unit (WTRU) may be configured to operate using one or more (e.g., two) types of resource scheduling for sidelink transmissions. For example, the WTRU may be configured to operate in a network scheduling mode (e.g., mode 3), where a network may select sidelink resources for the WTRU for sidelink transmissions. The WTRU may be configured to operate in an autonomous scheduling mode (e.g., mode 4), where a WTRU may autonomously select sidelink resources for sidelink transmissions. A WTRU may be configured to operate in the network scheduling mode or the autonomous scheduling mode. When used herein, the terms network-scheduled WTRU, mode 3 WTRU, and/or Mode 1 may be used to refer to a WTRU configured to receive network scheduling assignments for device-to-device (D2D), sidelink, and/or V2X communications. A network-scheduled WTRU (e.g., a WTRU operating in a network-scheduling mode) may request a resource for side link communication to an eNodeB (eNB). When used herein, the terms autonomously-scheduled WTRU, mode 4 WTRU, and/or Mode 2 may be used to refer to a WTRU configured to operate such that WTRU autonomously selects D2D, sidelink, and/or V2X resources for communication, for example from one or more pools of configured resources. For example, the WTRU may select the resource based on sensing (e.g., measurements). A network-scheduled WTRU may operate within network coverage. An autonomous-scheduled WTRU may be inside or outside of network coverage.

Although examples may be disclosed in terms of V2X communications, the examples described herein are not meant to be limited only to communications for V2X applications. For example, the examples may be applicable to any type of direct D2D communications, for example to support various types of applications and/or use cases (e.g., drone communications, Internet of Things (IoT) applications, industrial communications, etc.).

Resources used for transmission and/or reception of sidelink may be comprised in one or more resource pools. A resource pool may correspond to a set of repeating time-frequency patterns. Network-scheduled and autonomous-scheduled WTRUs may be assigned different resource pools to avoid resource collision. A transmission and/or a monitoring resource pool may be configured to a WTRU e.g. if the WTRU is inside network coverage. The resource pool may be configured to the WTRU via SIB21 or dedicated RRC signaling. The resource pool may be preconfigured. For example, the resource pool may be preconfigured if a WTRU is outside network coverage.

Scheduling for a WTRU may be divided into one or more types. Dynamic scheduling and semi-persistent scheduling (SPS) may be used for a network-scheduled transmission. Forward booking may be used for autonomous-scheduled transmission. Forward booking may refer to an autonomously scheduled WTRU reserving a particular and/or periodic resource for use in the future. A resource grant for a WTRU may be valid for a scheduling instant (e.g., a single scheduling instant) in dynamic scheduling. A resource grant for a WTRU may be retained for a certain period for SPS or forward booking scheduling. A WTRU may transmit PSCCH and PSSCH simultaneously in one transmission interval (TTI). For example, the WTRU may transmit PSCCH and PSSCH simultaneously when the WTRU has a resource grant and a message to transmit. A selected or assigned grant may include control (e.g., PSCCH) and data (e.g., PSSCH) resources. The resources may be either contiguous or spread.

Pool sharing between network-scheduled and autonomous-scheduled WTRUs may be used to improve spectral efficiency of a system. For example, in situations where no network-scheduled WTRU is present, a autonomous-scheduled WTRU may use a pool of resources for both network-scheduled and autonomous-scheduled WTRUs. For example, the autonomous-scheduled WTRU may use the pool resource when the autonomous-scheduled WTRU is outside of a coverage area. In situations where no autonomous-scheduled WTRU is present, a network-scheduled WTRU may use the pool of resources for both network-scheduled and autonomous-scheduled WTRUs.

In situations where both network-scheduled and autonomous-scheduled WTRUs are present, enabling pool sharing between network-scheduled and autonomous-scheduled WTRUs may result in collisions. Collisions may occur between network-scheduled and autonomous-scheduled transmission. For example, collisions may occur if the transmission resource scheduled to a network-scheduled WTRU overlaps with the transmission resource of a autonomous-scheduled WTRU. Collisions may occur when network-scheduled and autonomous-scheduled WTRUs share the same resource pool. Collisions may occur because the base station does not control the autonomous-scheduled WTRU scheduling.

Implementations may be proposed herein for minimizing resource collisions when resource pool sharing between network-scheduled and autonomous-scheduled WTRUs is enabled. The terms "mode 3 WTRU" and "network-scheduled WTRU" may refer to a WTRU using network-scheduled resources for sidelink transmission herein. The term "mode 4 WTRU" may refer to a WTRU using autonomous-scheduled resources for sidelink transmission herein. A WTRU may operate in both scheduling modes. For example, the WTRU may operate in both scheduling modes simultaneously. The WTRU may operate in one mode for one sidelink transmission and operate in another mode for a later sidelink transmission. The terms "mode 3," "network scheduling mode," and "network-scheduled" may be used interchangeably herein. The terms "mode 4," "autonomous scheduling mode," and "autonomous-scheduled" or "WTRU-scheduled" may be used interchangeably herein. Implementations written in the context of network-scheduled WTRUs and autonomous-scheduled WTRUs may be applicable to any scheduled or WTRU autonomous mode of operation.

A network-scheduled WTRU may be configured to perform one or more actions. For example, a network-scheduled WTRU may perform sensing. A WTRU may perform sensing on a specific configured resource pool.

A WTRU may be configured to sense resources within a predefined resource pool or set of resource pools. For example, the WTRU may be configured to sense resources within its transmission/reception pool. The resource pool upon which to perform sensing (e.g., the sensing pool) may be signaled to the WTRU. The signaling may be performed via dedicated RRC signaling or common RRC signaling. For example, the signaling may be performed via SIB. The WTRU may be configured to perform full sensing. The WTRU may monitor resources in the sensing pool except the subframes where the WTRU is transmitting. For example the WTRU may monitor all resources in the sensing pool in full sensing.

Figure 2:
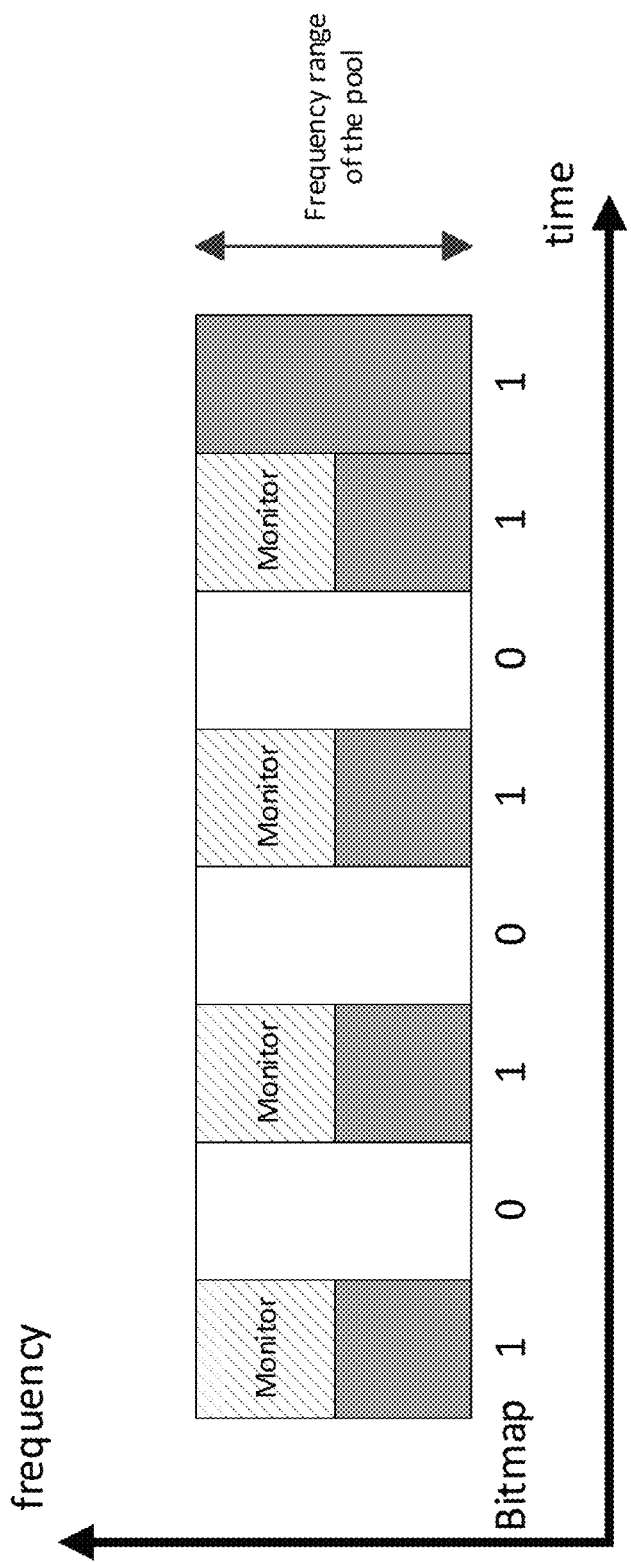
FIG. 2 shows an example of partial sensing.

A WTRU may be configured to perform partial sensing. The WTRU may perform sensing in a subset of the frequency resources and in a subset of the subframes in the sensing pool. FIG. 2 shows an example of partial sensing. As shown in FIG. 2, the WTRU may perform sensing in half of the frequency resource, and in four out of five subframes in its sensing pool. The subset of resources that form the sensing pool may be explicitly or implicitly configured from a network. The WTRU may be configured to autonomously select the subset. For example, a WTRU may be configured with multiple component carriers (CCs) and/or bandwidth parts (BWPs). The WTRU may select the subset depending on the activated CCs or BWPs.

A WTRU may be configured to perform sensing in a set of time/frequency resources which depend, for example, on the WTRU's geolocation. The geolocation may be expressed in terms of latitude and longitude coordinates. For example, the mapping between geolocation and sensing resources may be configured via SIB. For a given geolocation, the WTRU may be configured with sensing resources (e.g., the sensing pool), which may be derived from the geolocation and information transmitted in SIB.

The WTRU may receive a sensing request from the network. The sensing request may indicate whether the WTRU may perform either partial or full sensing. The WTRU may receive a sensing request which may include a sensing resource indication. For example, the sensing resource indication may include a starting subframe, a number of subframes, subchannel indices, etc. The sensing request may take the form of an RRC reconfiguration sent by the network to the WTRU which may turn sensing on or off for a specific WTRU and/or may configure specific parameters associated with sensing and/or reporting. The WTRU may receive a configuration for sensing via RRC and may receive a MAC CE or DCI message to turn sensing on or off.

A WTRU may perform event-triggered sensing. For example, the WTRU may perform sensing when one or more of the following events occurs. The WTRU may perform sensing when the WTRU has data to transmit. The WTRU may perform sensing when the WTRU sends a scheduling request. The WTRU may perform sensing when the WTRU receives an uplink grant. The WTRU may perform sensing when the WTRU performs a BWP switch. The WTRU may perform sensing when the WTRU changes carrier aggregation configuration. The WTRU may perform sensing when the WTRU sends a buffer status report (BSR). The WTRU may perform sensing when the WTRU receives a side link grant. The WTRU may perform sensing when the channel busy ratio (CBR) over a subset of subchannels becomes larger than a threshold.

A WTRU may be configured with one or more priorities that triggers sensing. The WTRU may start sensing upon receiving a packet with the configured priorities.

A WTRU may determine a resource pool to perform sensing based on packet QoS parameters. The WTRU may determine its intended sensing resources (e.g., which may be referred to as preferred resources) to perform sensing and/or monitoring based on one or more of the following factors. The WTRU may determine its intended sensing resources based on the QoS of the transmission packet. The transmission packet may be associated with the WTRU side link service type. The WTRU may determine its intended sensing resources based on subsets of the available resource broadcast by the network. The WTRU may determine its intended sensing resources based on resources from previous transmissions. The WTRU may determine its intended sensing resources based on resources from a past sensing result. For example, the resources from the past sensing result may include resources with CBR and/or channel occupation ratio (CR) statistics that meet a pre-configured threshold.

A WTRU may be configured to perform mapping between QoS of a packet and a pool to perform sensing upon. A WTRU may be configured (e.g., pre-configured) to perform sensing on multiple sensing pools. For example, the WTRU may be configured to perform sensing on multiple sensing pools depending on V2x services and the available system bandwidth. The WTRU may determine whether to perform sensing in a particular pool based on a characteristic of the pool. The WTRU may determine whether to perform sensing in a particular pool based on based on the priority and/or QoS of the packet. The characteristic of the pool may include one or more of the following. The characteristic of the pool may include the bandwidth of the pool. The characteristic of the pool may include the time granularity of the pool. The characteristic of the pool may include the numerology of the pool. The characteristic of the pool may include the symbol configuration of the pool. For example, the symbol configuration may be the configuration that identifies symbols for sidelink transmission/reception for the whole slot/subframe.

Figure 3A:
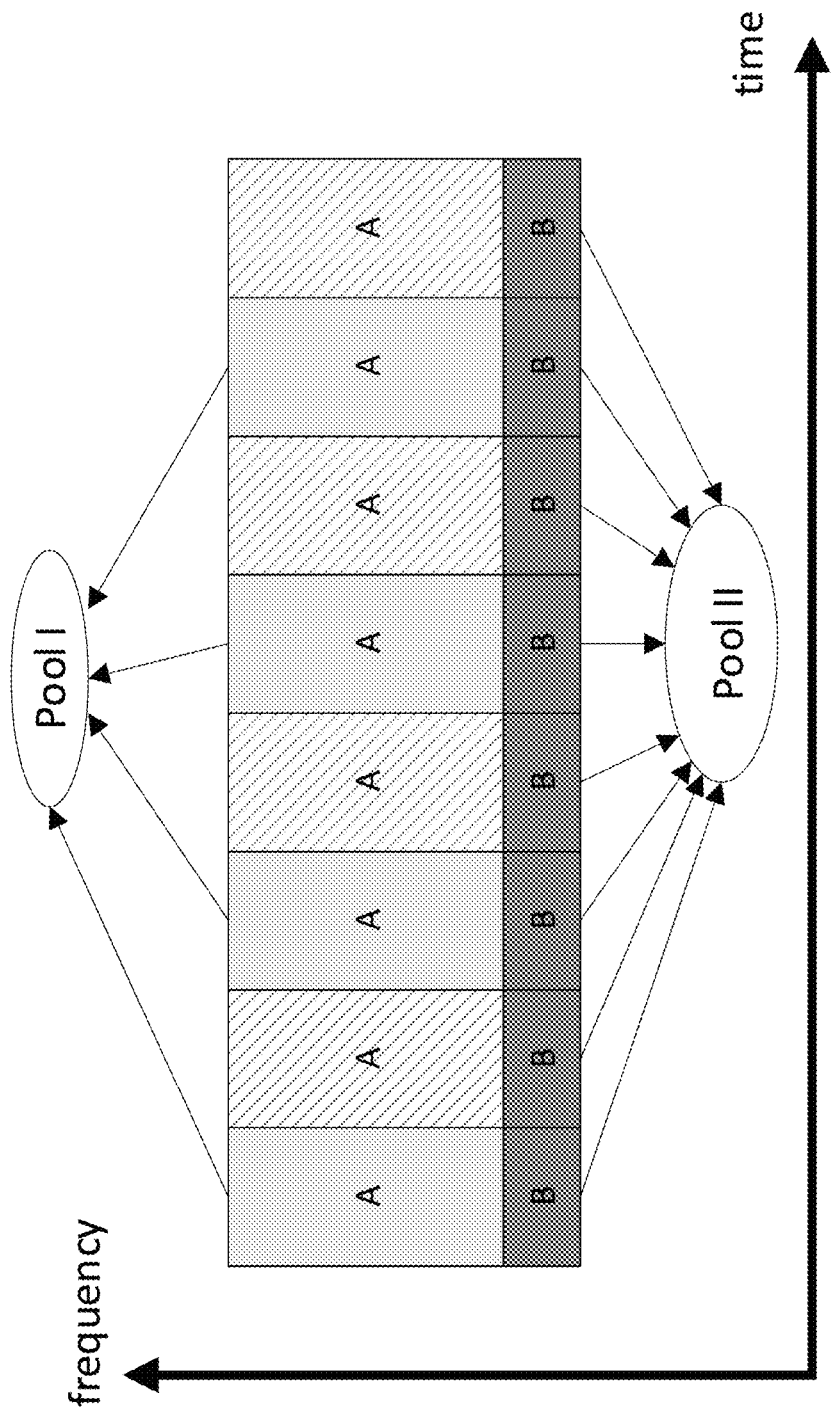
FIG. 3A shows an example of sensing a resource location based on QoS of a packet.

For example, as shown in FIG. 3A, a WTRU may be configured to perform sensing in a frequency region when the ProSe per-packet reliability (PPPR) of the packet is high, and in a different frequency region when the PPPR of the packet is low. For example, as shown in FIG. 3A, the WTRU may perform sensing in frequency region A when the PPPR of the packet is high and in frequency region B when the PPPR of the packet is low. The WTRU may determine to perform sensing in a region (e.g., frequency region A shown in FIG. 3A) because the region supports a large bandwidth for high throughput transmission. The WTRU may be configured to perform sensing in a pool when the ProSe per-packet priority (PPPP) of the packet is high, and in a different pool when the PPPP of the packet is low. For example, as shown in FIG. 3A, the WTRU may perform sensing in pool I when the PPPP of the packet is high and in pool II when the PPPP of the packet is low. The WTRU may determine to perform sensing in a resource pool (e.g., pool I shown in FIG. 3A) because the resource pool supports low latency transmission, while another pool (e.g., pool II shown in FIG. 3A) may not support low latency transmission.

A WTRU may perform sensing on resources indicated by a network via broadcast. The WTRU may be configured to perform sensing on a subset of resources as indicated by the network via broadcast. This configuration may avoid resource collision with autonomous-scheduled transmissions of out-of-coverage WTRUs. For example, resource collision may be avoided since these WTRUs may not receive the broadcast transmission of the network. The WTRU may determine one or more subsets of the configured resources for sensing. For example, the WTRU may determine the subsets based on properties and/or parameters of the configured resources. Properties and/or parameters of the configured resource may include one or more of the following. A time resource unit (e.g. a symbol/slot/subframe) may be a property and/or parameter of the configured resource. The frequency resource granularity (e.g., the sub-carrier spacing/resource block/BWP) of the configured resource may be a property and/or parameter of the configured resource. The priority level of a configured resource may be a property and/or parameter of the configured resource. TX parameters associated with the configured resource may be a property and/or parameter of the configured resource.

A WTRU may perform sensing on past sensing resources or previously used resources for transmissions. A WTRU may be configured to perform sensing on all sensing resources or available sensing resources in past sensing periods. The WTRU may determine to perform sensing on the available sensing resources, for example since the probability that each available resource in the last sensing period is occupied may be lower than that of the unavailable resources in the last sensing period. The WTRU may be configured to perform sensing in a set of resources used for its previous transmissions. Resources from the previous transmissions may be good resources for future transmissions since they may not be occupied by other transmissions.

A WTRU may determine sensing resources based on statistics over a pre-configured period associated with one or more of the following. The WTRU may determine sensing resources based on statistics over a pre-configured period associated with received grants. The WTRU may determine sensing resources based on statistics over a pre-configured period associated with sensing results including received signal code power (RSCP), RSRP, or RSSI and resource reservation information. The WTRU may determine sensing resources based on statistics over a pre-configured period associated with CBR and/or CR.

A network-scheduled WTRU may be configured to decode the sidelink control information (SCI) transmitted by other WTRUs. The WTRU may determine the location of PSSCH. For example, the WTRU may determine the location of PSSCH based on decoding information in the SCI. The WTRU may measure the RSSI/RSRP of the PSSCH to determine a received power level of the decoded message. The WTRU may determine the reserved resource, the priority of the packet, and/or the scheduling mode of the transmitting WTRU by decoding the SCI. The WTRU may determine whether the channel indicated in PSSCH is available based on this information.

A network-scheduled WTRU may receive multiple grants for possible transmission and select one for transmission based on sensing. The WTRU may receive multiple grants for one or more possible transmissions via DCI. The WTRU may perform sensing on the scheduled transmission resources and determine if the configured grants are available at the scheduled transmission based on the sensing result. For example, the WTRU may determine if any of the configured grants are available. The WTRU may transmit the scheduled packet. For example, the WTRU may transmit the scheduled packet when the WTRU determines an available resource for transmission among the configured grant. The WTRU may request another resource. For example, the WTRU may request another resource when none of the scheduled transmission resources are available. The WTRU may determine whether the scheduled transmission resources are available based on the sensing result. The WTRU may drop the packet due to the latency requirement and send an indication to the network accordingly.

A network-scheduled WTRU may perform reporting. The WTRU may be configured to evaluate a sensing result. For example, the WTRU may determine channel availability based on a sensing result. Channel availability may include the availability of one or more time and/or frequency resources. The WTRU may interpret results of a sensing event to determine whether a channel is available or unavailable. A channel may be considered available if it is able to be used for a transmission and unavailable if it is not able to be used for a transmission. The WTRU may use a channel that it has determined to be available to transmit one or more scheduled packets.

For example, the WTRU may evaluate the sensing result by using resource selection of autonomous-scheduled WTRUs. Resource selection may include the WTRU excluding one or more resources from a plurality of resources that overlap with another WTRU's reservation. For example, the WTRU may exclude one or more resources that correspond to reserved resources for another WTRU. For example, if RSRP_PSSCH is greater than a threshold, the WTRU may determine a resource is being used and thus is unavailable for the WTRU's transmission. In an example, the WTRU may exclude the resource associated with the decoded SCI if the RSRP_PSSCH of the resources indicated in the SCI is greater than a threshold. If the RSRP_PSSCH of the resources indicated in the SCI is not greater than the threshold (e.g., less than or equal to the threshold), the WTRU may determine not to exclude the resource from being a reselection candidate. For example, even though the resource may have been reserved by the SCI, the RSRP being less than a threshold may indicate the WTRU for which the resource is reserved is far enough away that interference may not be significant and/or the other WTRU has finished using the resource.

The threshold may depend on the relative priority of the packets at the transmitter and/or the receiver. The WTRU may increase the threshold and determine whether to exclude the resource. For example, if the remaining resources for selection/reselection (e.g. assuming exclusion) is smaller than Y % of the total resource, where Y may be a variable between 0 and 100, the WTRU may increase the RSRP_PSSCH threshold and re-evaluate the SCI results. Resource selection may include the WTRU ranking the remaining resources. The remaining resources may be ranked, for example, in ascending order of S-RSSI. Resource selection may include the WTRU (e.g., gradually) selecting the ranked resources until the selected resources, which may be denoted as set $S_B$, reach X % of the total resource. The WTRU may determine the availability of one or more resources in the set of resources Se when it evaluates the sensing result.

A WTRU may be configured to evaluate a sensing result by decoding SCI. The WTRU may determine that a resource that overlaps with another WTRU's transmission is unavailable, for example where the SCI is used to determine whether the resource is reserved for the other WTRU's transmission. The WTRU may determine that a resource overlaps with another WTRU's transmission based on decoding SCI. The WTRU may determine that a resource with a measured RSRP_PSSCH of a resource reserved by the SCI greater than a threshold is unavailable. If the RSRP_PSSCH of the resource reserved by the SCI is less than a threshold, the WTRU may consider the resource available for selection/reselection.

A WTRU may be configured to determine parameters to evaluate a sensing result. The WTRU may determine the priority of the packet when it evaluates the sensing result. For example, the WTRU may determine the priority of the packet to determine the threshold for resource selection (e.g., prio_Tx). The WTRU may determine the size of $S_B$ when it evaluates the sensing result. The WTRU may determine a sensing evaluation window [T1, T2] when it evaluates the sensing result. The WTRU may determine a resource reservation interval (e.g., P_Resvp_Tx) when it evaluates the sensing result. The resource reservation interval may be used to avoid a potential collision with forward booking resources of the WTRU.

A WTRU may be configured to determine a value for prio_Tx. prio_Tx may be a value indicating a priority level for a packet that the WTRU is scheduled to transmit. For example, a WTRU may determine that the value of prio_Tx is the highest priority data in a buffer. The WTRU may determine that the value of prio_Tx is the priority of a logical channel associated with a configured SPS resource. For example, the WTRU may determine that the value of prio_Tx is the priority of a logical channel associated with a configured SPS resource when the WTRU evaluates a sensing result before the configured SPS resource. The WTRU may select the highest priority corresponding to a destination ID. The destination ID may be obtained from an upper layer. The upper layer may be, for example, a V2x layer.

A WTRU may be configured to determine a size of $S_B$. $S_B$ may be a set of one or more time and/or frequency resources. Resources may be selected by a WTRU for inclusion in $S_B$ as described herein. The WTRU may determine the size of $S_B$ by setting X, which may determine the size of $S_B$, equal to 20% (e.g., which may be used for autonomous-scheduled resource selection). The WTRU may select the size of $S_B$ based on, for example, a size of a grant associated with a reporting message. The size of $S_B$ may depend on a number of available resources. For example, the WTRU may want to report the available resources to the network.

A WTRU may be configured to determine a value of T2. T2 may be a time representing an end of a sensing window. The WTRU may determine the value of T2 based on, for example, a scheduled and/or configured grant for reporting. The WTRU may determine the value of T2 based on a duration between a subframe in which the WTRU is evaluating a sensing result and the closest subframe in which the WTRU is configured with a semi-persistent scheduling (SPS) resource. The WTRU may determine the value of T2 based on a priority/delay budget of data associated with the configured SPS resource, which may appear right before or after the WTRU evaluates the sensing result. The WTRU may determine the value of T2 based on a delay budget of a highest priority data in a buffer or a priority of data in the buffer. The WTRU may determine the value of T2 based on the periodicity of the configured periodic reporting.

A WTRU may be configured to determine a value for $P_{\_Resvp\_Tx}$. $P_{\_Resvp\_Tx}$ may be a resource reservation interval, which may be used during resource selection to avoid selecting an occupied resource (e.g., in the next several intervals). A WTRU may select a value of $P_{\_Resvp\_Tx}$ based on a configured reservation period of SPS. The reservation period may be determined based on the logical channel of the data in the buffer. The reservation period may be determined based on the configured SPS time of the WTRU. The value of $P_{\_Resvp\_Tx}$ may be determined based on a lowest possible configured reservation period of the configured SPS resource. For example, the lowest possible configured reservation period of the configured SPS resource may be 20 ms.

Figure 3B:
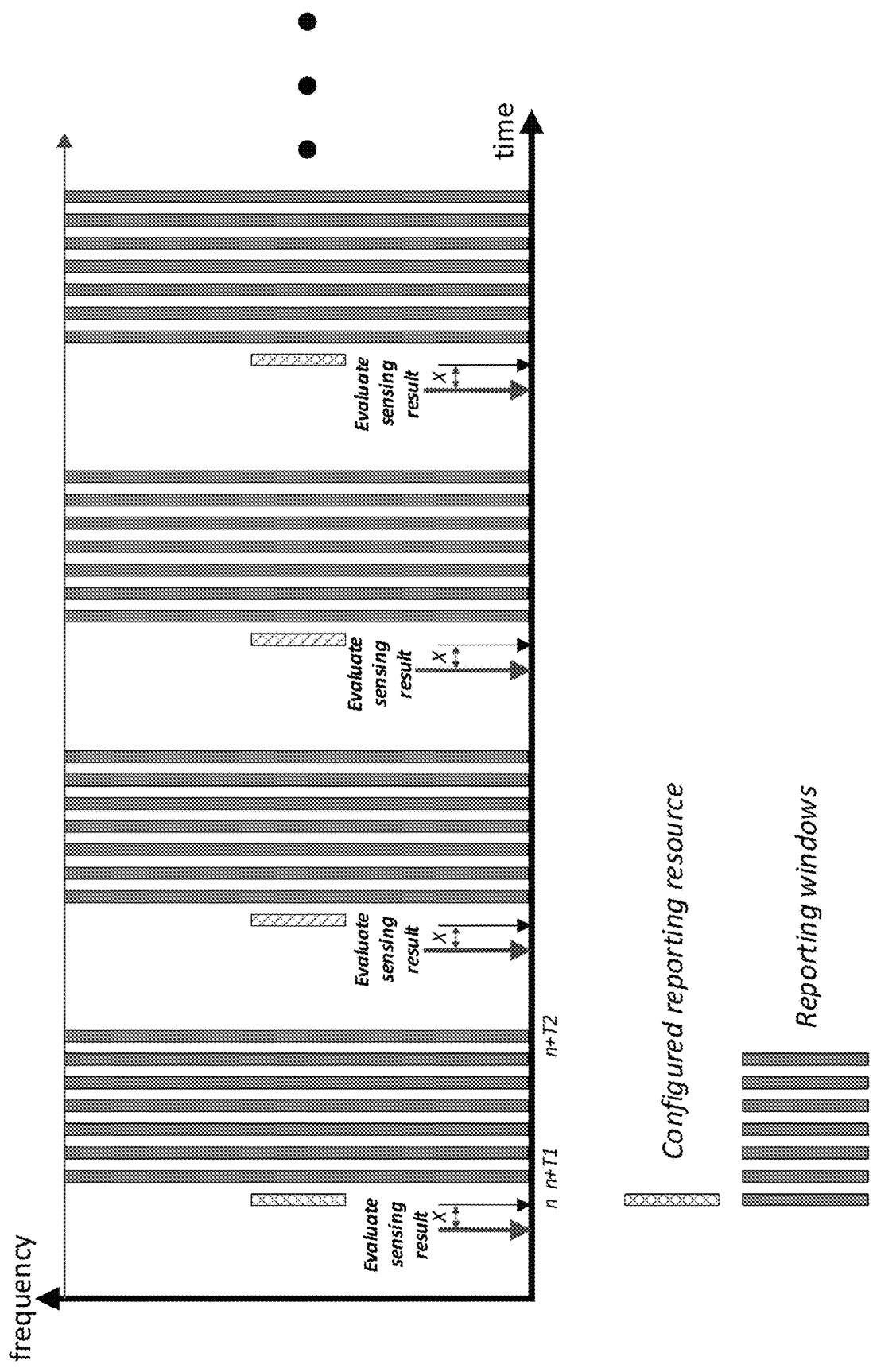
FIG. 3B shows an example of a WTRU determining a time to evaluate sensing results based on configured reporting.

A WTRU may be configured to determine when to evaluate a sensing result. A WTRU may determine to evaluate a sensing result X subframes before a configured reporting event. A value of X may depend on the WTRU's capability. This may ensure availability of the sensing result when the WTRU performs reporting. An example of a WTRU determining a time to evaluate sensing results based on its configured reporting is shown in FIG. 3B. As shown in FIG. 3B, a WTRU may evaluate a sensing result 4 subframes before a configured periodic reporting resource. For example, the WTRU may evaluate the sensing result 4 subframes before each configured periodic reporting resource.

A WTRU may evaluate a sensing result X subframes before an assigned SPS resource. The value of X may depend on the sensing evaluation window [T1, T2]. The value of X may depend on a priority associated with the configured SPS resource. The value of X may depend on the highest priority of the data in the buffer. The value of X may depend on the time between the arrival of a packet and its configured SPS grant.

A WTRU may be configured to evaluate a sensing result once every N configured SPS resources. The value of N may be determined by the WTRU to balance between the accuracy of the scheduled SPS resource and computational complexity of the WTRU. The WTRU may be able to evaluate the accuracy of every SPS resource, e.g. if N=1. The value of N may be determined based on the periodicity of the SPS resource. The value of N may be determined based on the sensing window [T1, T2].

Figure 3C:
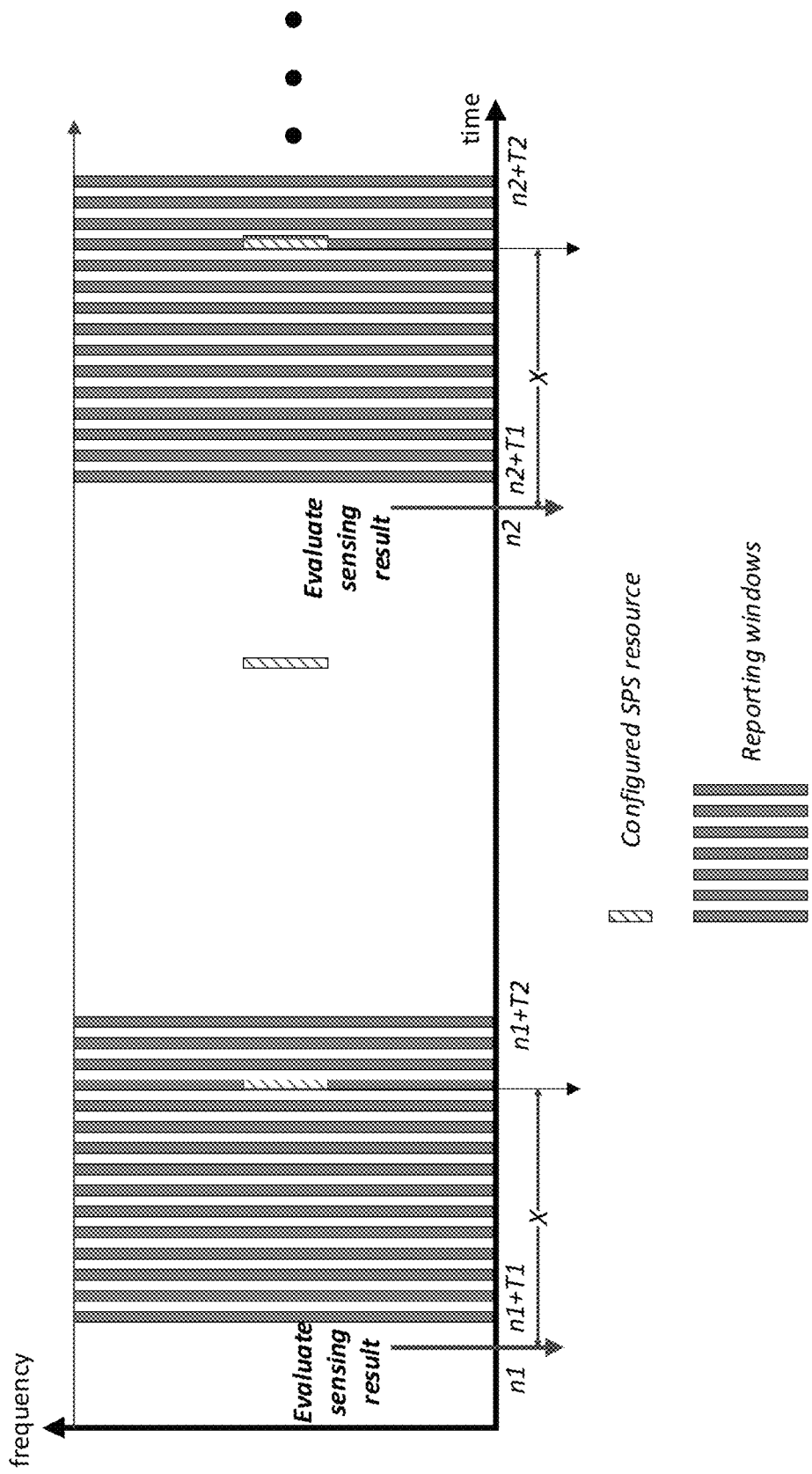
FIG. 3C shows an example of a WTRU determining a time to evaluate sensing results based on one or more configured SPS resources.

FIG. 3C shows an example of a WTRU determining a time to evaluate sensing results based on one or more configured SPS resources. As shown in FIG. 3C, a WTRU may be configured with an SPS resource with a periodicity of 100 ms. The WTRU may select X=60 ms, T1=4 ms, T2=100 ms, and N=2.

A WTRU may be configured to determine to evaluate a sensing result based on a trigger. The WTRU may determine to evaluate a sensing result when the WTRU has data to transmit. The WTRU may determine to evaluate a sensing result when the WTRU detects a possible collision with its SPS resource, e.g. by decoding SCI of other WTRUs. The WTRU may determine to evaluate a sensing result when it detects a change in the periodicity of the packets having configured SPS resources. The WTRU may determine to evaluate a sensing result when the WTRU sends an RRC message (e.g., UEAssistantInformation) to provide a network with information related to a change in the periodicity or offset of periodic data. The WTRU may determine to evaluate a sensing result when CR becomes greater or lower than a threshold. The WTRU may determine to evaluate a sensing result when a set of resources becomes occupied, e.g. based on decoding SCI of other WTRUs. The WTRU may determine to evaluate a sensing result when it sends a scheduling request. The WTRU may determine to evaluate a sensing result when it receives an uplink grant. The WTRU may determine to evaluate a sensing result when it performs a BWP switch. The WTRU may determine to evaluate a sensing result when it changes carrier aggregation configuration. The WTRU may determine to evaluate a sensing result when it sends BSR. The WTRU may determine to evaluate a sensing result when it receives a side link grant. The WTRU may determine to evaluate a sensing result when the CBR over a subset of subchannels or all subchannels in the resource pool becomes larger than a threshold.

The WTRU may be configured to report sensing results periodically. Reporting sensing results periodically may result in signaling overhead but may be beneficial for the network in side link scheduling. Reporting sensing results periodically may allow the network to allocate the sensing task to WTRUs other than those which may be scheduled at a given time.

The WTRU may perform reporting when one or more of the following events occurs. The WTRU may perform reporting when the WTRU detects a possible collision with its configured SPS resources. The WTRU may perform reporting when the WTRU has data to transmit. The WTRU may perform reporting when CR exceeds a threshold. The WTRU may perform reporting when a set of resources becomes occupied (e.g., based on sensing results). The WTRU may perform reporting when the WTRU sends a scheduling request. The WTRU may perform reporting when the WTRU receives an uplink grant. The WTRU may perform reporting when the WTRU performs a BWP switch. The WTRU may perform reporting when the WTRU changes carrier aggregation conformation. The WTRU may perform reporting when the WTRU sends BSR. The WTRU may perform reporting when the WTRU receives a side link grant. The WTRU may perform reporting when the CBR over a subset of subchannels exceeds a threshold.

A network-scheduled WTRU may be configured to perform sensing on a set of resources. The set of resources may be identified by a certain time/frequency pattern. The WTRU may send a sensing report to the network. The WTRU may send a sensing report when it determines that the resources (e.g., or a percentage thereof) have become occupied. The set of resources and the percentage utilization that triggers the event and the sensing report may be configured by the network.

The WTRU may be configured to perform reporting when it detects a possible collision in an assigned SPS resource. The WTRU may evaluate the sensing result before the configured SPS resource. The WTRU may perform reporting if the configured resource is not included in the set of available resources $S_B$ or a set of available resources the WTRU wants to report to the network. The set of available resources the WTRU wants to report to the network may be a subset of $S_B$. The WTRU may perform reporting if the configured SPS resource overlaps with a transmission detected by decoding SCI of other WTRUs.

A WTRU may be configured to send a report to a network in a specific format. The sensing result may be sent along with sidelink BSR. For example, the sensing result may be sent in the sidelink BSR. The sensing result may be sent in a separate MAC CE. The MAC CE may also be sent along with the sidelink BSR. The amount of the sensing report information/bits may depend on the scheduled grant of the WTRU. For example, the WTRU may report a full sensing report if the grant is available. The WTRU may report a part of the sensing result, or may request another grant to send the sensing result if the grant is limited. In another example, the WTRU may be configured with a semi-persistent (SPS) UL grant to report the sensing results. The SPS resource may be used to periodically report the sensing results.

A WTRU may be configured to determine a sensing report window. The WTRU may report availability of resources over the sensing report window to a network. The WTRU may use the same or a similar report window as the resource selection window used by autonomous-scheduled WTRUs. The WTRU may determine the availability of resources within a window. The window may be denoted as [n+$T_1$, n+$T_2$]. n may indicate the symbol/slot/subframe for a timing reference for sensing. The timing reference for sensing may indicate when the WTRU receives a sensing request. The timing reference for sensing may indicate when the WTRU performs reporting. The timing reference for sensing may indicate the end of the sensing period. $T_1$ and $T_2$ may indicate the start and end time of the window. The value of $T_1$ may be determined by the WTRU's capability and/or the frame/slot structure configuration of the system. The value of $T_2$ may be determined by the delay requirement of the packet for which the WTRU is transmitting a sensing result to the network or the radio activity of the resource pool. The report of [n+T1, n+T2] may be most applicable to event-triggered sensing where the WTRU sends sensing results along with BSR and therefore may know the delay requirements of the packet.

The sensing window may be configured by the network in dedicated (e.g., RRC) or broadcast signaling. For example, the values of $T_1$ and $T_2$ may be configured by the network. The network configuring the sensing window may be used in one or more cases. For example, the sensing window for periodic sensing reports may be configured by the network. Whether the reporting window is determined by the WTRU or configured by the network may be determined depending on whether the WTRU is configured to perform periodic reporting or event triggered reporting. The reporting window for an event-triggered report may be determined by the WTRU. The reporting window for a periodic report may be configured by the network or determined by the WTRU.

A WTRU may determine the expected RSRP or RSSI of a resource, which may indicate the interference level if the WTRU uses the resource. The WTRU may determine the availability and/or unavailability of a resource to be reported to the network. The WTRU may determine the availability and/or unavailability of the resource based on the RSRP or RSSI of the resource. The WTRU may determine the expected RSRP or RSSI of a resource in the report window. The WTRU may determine the expected RSRP or RSSI of a resource by decoding the SCI and measuring the RSRP or RSSI of the PSSCH indicated by the SCI.

Figure 4:
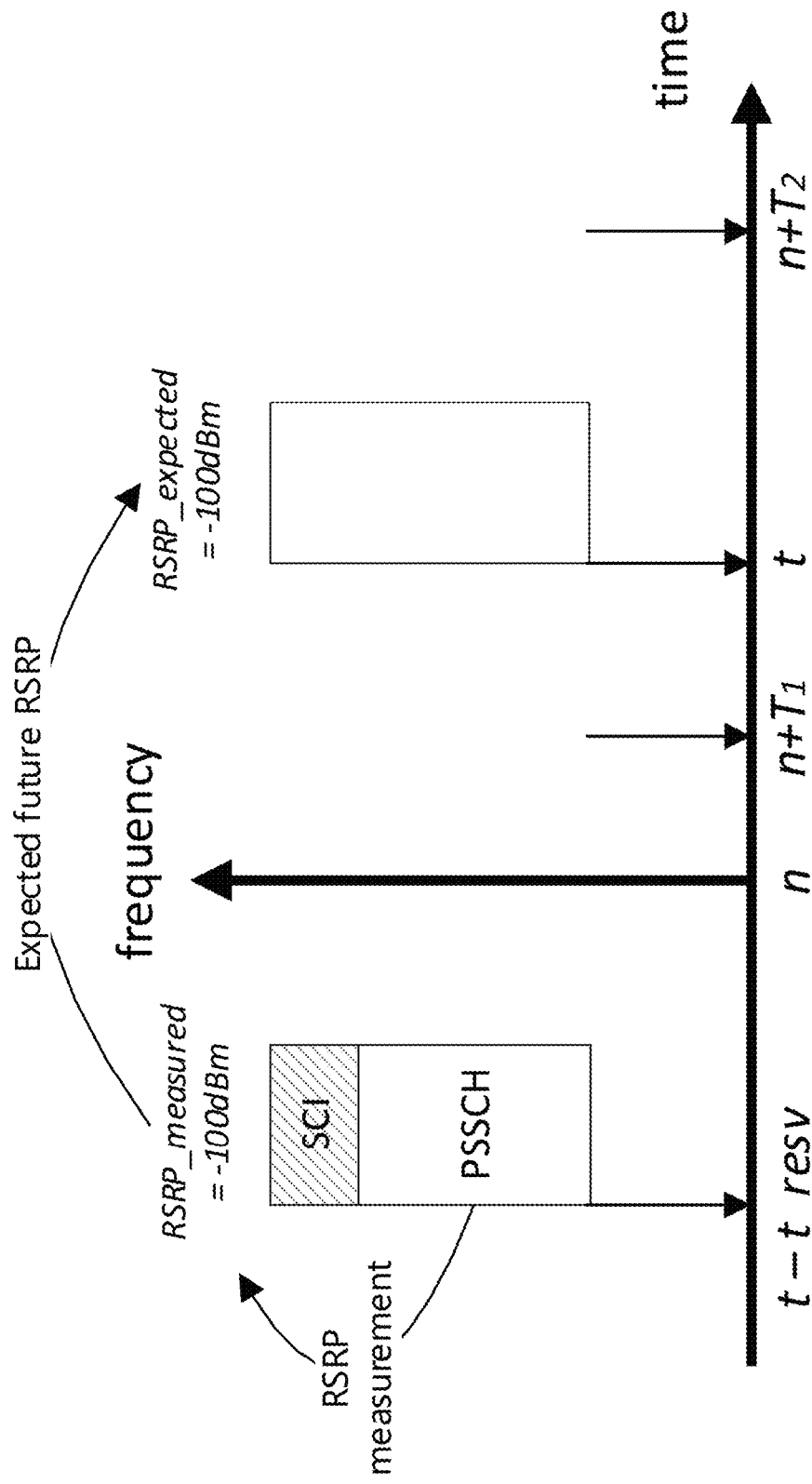
FIG. 4 shows an example determination of an expected RSRP based on a past RSRP result.

FIG. 4 shows an example of a WTRU determining a sensing period corresponding to a sensing report window based on a preconfigured set of t_resv, which may be used to indicate the reservation period of a resource. The WTRU in FIG. 4 may process the sensing result of the determined sensing resource. As shown in FIG. 4, a WTRU may receive a packet at time t−t_resv, where t_resv may be indicated in the SCI of the packet. The RSRP measured for the PSSCH at time t−t_resv may be RSRP_measure=−100 dBm. The WTRU may determine that the expected RSRP (e.g., RSRP_expected) of the resource at time t may be RSRP_expected=−100 dBm.

A WTRU may determine the expected RSRP or RSSI of a resource by calculating the weighted average of the RSRP or RSSI of the resource during the sensing time. For example, the WTRU may determine the expected RSRP or RSSI of the resource at time t by taking the weighted average of the RSRP or RSSI in time t-k*t_period, where k=1, 2, ..., K. The value of t_period may be determined by the reservation period of a packet in the resource, which may be configured (e.g., pre-configured) or signaled to the WTRU via RRC/SIB. The value of K may be preconfigured and may indicate a maximum number of t_resv intervals the WTRU make look back. The weighted values may decrease when k increases.

Figure 5:
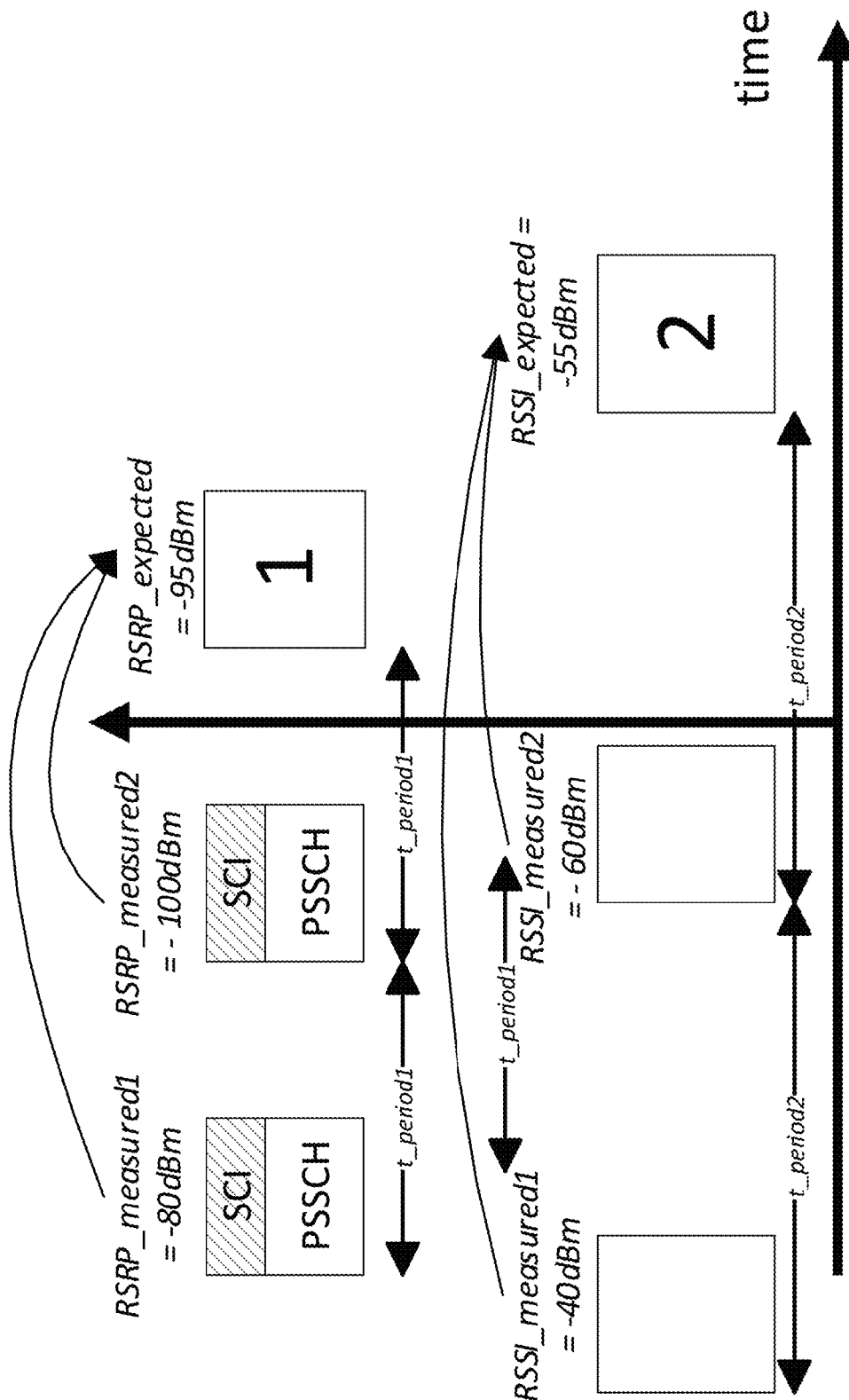
FIG. 5 shows an example determination of an expected RSRP or RSSI by weighted average of a past RSRP or RSSI.

FIG. 5 shows an example of a WTRU determining expected RSRP or RSSI by weighted average of previous RSRP or RSSI. The WTRU may apply a weighted average of one or more (e.g., two) previous transmissions to determine expected RSRP or RSSI. For example, the weighted values of two past transmissions may be set to 0.75 and 0.25. t_period1 may be determined by decoding the SCI while t_period2 may be chosen by WTRU configuration. The value of t_period1 indicated in SCI may be used to determine the time location of resource 1, whose expected RSRP may be calculated based on averaging the RSRP of the two previous resources. The value of t_period2 may be configured by the network or preconfigured, and may be used to determine the time location of resource 2, whose expected RSSI may be calculated based on averaging the RSSI of the two previous resources.

A WTRU may determine available and/or unavailable resources. The WTRU may determine the availability of a resource by comparing the expected received RSRP or RSSI of the resource to a threshold. The threshold may be determined by the relative priority between the decoded packet and the transmit packet if the WTRU has a packet to transmit. The threshold may be determined by the priority of the decoded packet or configured (e.g., pre-configured). The WTRU may determine that resources that overlap with the unavailable resource (is considered unavailable. For example, the WTRU may determine that every resource that overlaps with the unavailable resource is considered unavailable.

Figure 6:
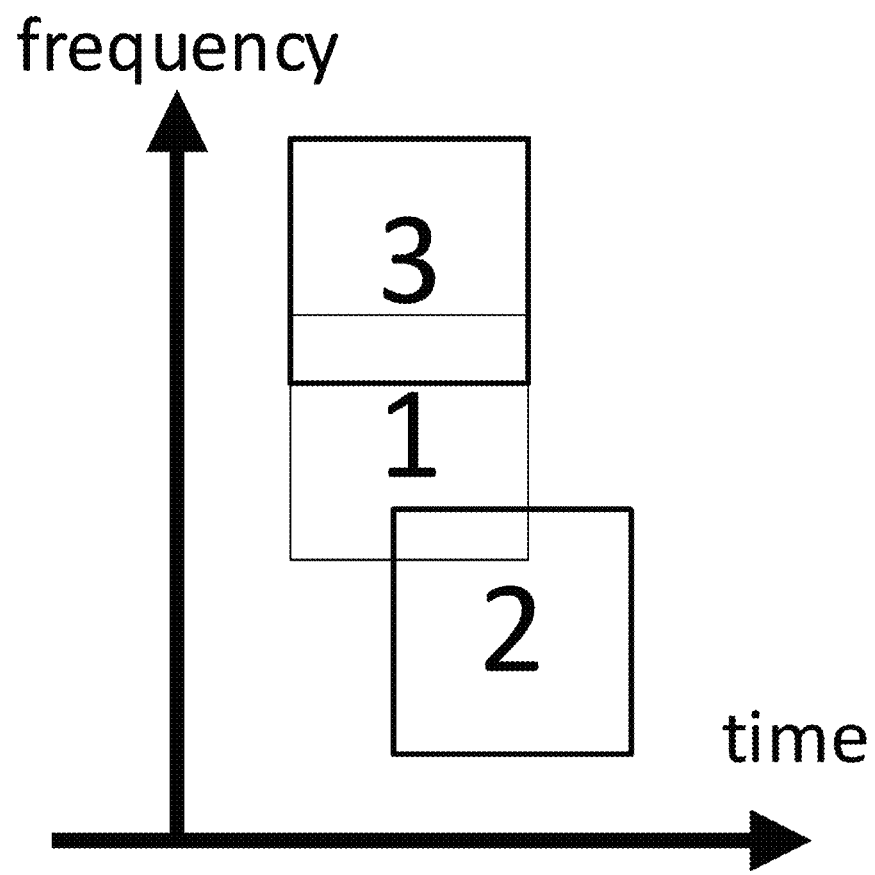
FIG. 6 shows an example determination of availability of a resource.

FIG. 6 shows an example of a WTRU determining the availability of a resource. The WTRU may determine that a resource is unavailable. For example, the WTRU may determine that resource 1 as shown in FIG. 6 is unavailable. Resources that overlap with the unavailable resource may also be considered unavailable. For example, the WTRU may determine that resources 2 and 3 as shown in FIG. 6 are unavailable because they overlap with resource 1.

Figure 7:
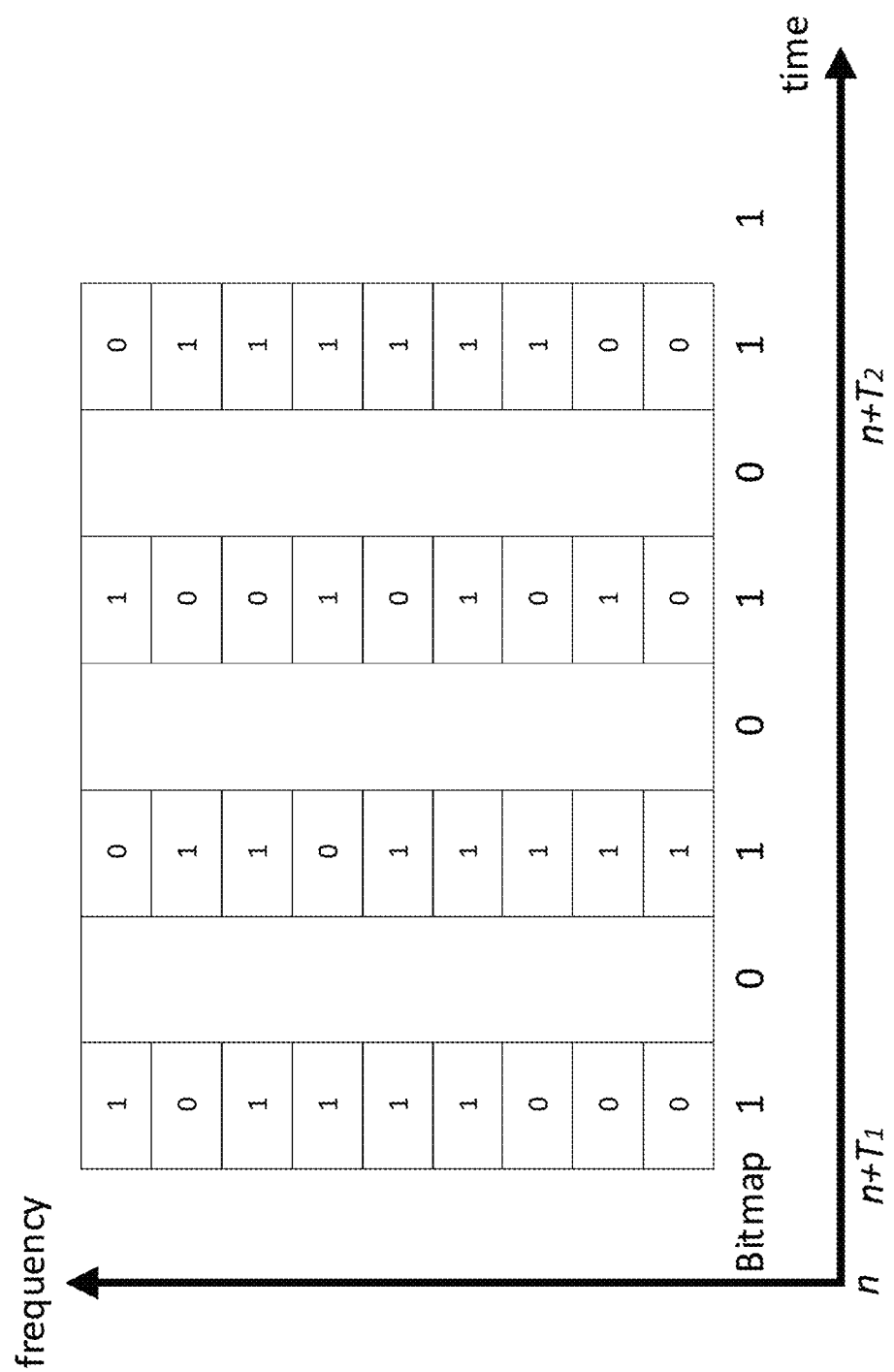
FIG. 7 shows an example of bitmap reporting.

A WTRU may be configured to send a sensing report in a specific format. A WTRU may report a bitmap per transmission pool. The bitmap may indicate the availability of each resource in a report window. A first value in the bitmap may indicate available and a second value may indicate unavailable. For example, a value of 1 may indicate that the resource is available and a value of 0 may indicate that the resource is unavailable, or vice versa. The WTRU may report the RSRP or RSSI level of resources per transmission pool. For example, the WTRU may report the RSRP or RSSI level of each resource per transmission pool if the threshold to determine the availability of a resource is undetermined. A WTRU may report a finite value associated with a configured range of RSRP or RSSI for resources. For example, the WTRU may report the finite value for each resource. FIG. 7 shows an example of bitmap reporting. As shown in FIG. 7, the WTRU may report the availability of the resource in the period $[n+T_1, n+T_2]$ in one transmission pool.

A WTRU may be configured to report a subset of the available resources. The WTRU may be configured to report N available resources. The WTRU may be configured to report M % of the available resources. The values of N and/or M may be configured (e.g., pre-configured) via RRC or SIB.

The WTRU may be configured to report the set of unavailable resources. The WTRU may be configured to report the available resource, a part of the available resource, or the unavailable resource, depending on the radio activity of the transmit pool.

A WTRU may report the difference (e.g., delta report) between a current report and a previous report. For example, the WTRU may report the difference to reduce the size of the reports. The WTRU may be configured to report available resources which were unavailable in the previous report and/or the unavailable resources which were available in the previous report. The WTRU may be configured to report the resources (e.g., time frequency locations) for which the availability or unavailability status has changed. The WTRU may provide a full report. The full report may include a bitmap indicating availability and/or unavailability. The WTRU may provide the full report periodically. The WTRU may provide the delta report relative to each previous full report, which may indicate the difference between the current sensing result and the previous full report sensing result.

A WTRU may be configured to perform periodic and/or event-triggered reporting. For example, a WTRU may be configured to perform both periodic and event-triggered reporting. The WTRU may be configured to periodically report a bitmap. The bitmap may indicate the availability and/or unavailability of resources in a reporting window. A WTRU may be configured to perform event-triggered reporting, for example in addition to periodic reporting. For example, a WTRU may report a difference (e.g., change) between availability and/or unavailability at a time of a last periodic report and availability and/or unavailability at a time of an event. As an example, a first periodic report may indicate that four resources are available and four resources are unavailable. The first periodic report may indicate which resources are the available resources and which are the unavailable resources. After transmission of the first periodic report, one of the unavailable resources may become available (e.g., or vice versa). The WTRU may then detect a trigger for sending an updated report. The trigger may be the change in resource availability or other triggers as described herein. The event trigger report may indicate the change in availability of the resource to the network.

An event-triggered report may be denoted or referred to as a "delta report." A resource may be changed from available to unavailable between two reporting times. The resource may be changed from available to unavailable because during an interval between two reporting times, the WTRU may detect one or more transmissions on the resource and/or the WTRU may use different values/parameters to determine the availability and/or unavailability of the resource. A PPPP threshold may be a value or parameter used to determine the availability and/or unavailability of the resource.

A WTRU may be configured to initiate an event-triggered report, for example, based on the occurrence of one or more of the following events (e.g., alone or in combination). A WTRU may send an event-triggered report based on the WTRU receiving data for which it is configured to perform transmission using a network scheduling mode. A WTRU may send an event-triggered report based on detecting a change in availability and/or unavailability of a number (e.g., one or multiple) of resources in a reporting window since a last periodic report. A WTRU may send an event-triggered report based on detecting a change in availability and/or unavailability for a proportion of resources in a reporting window. For example, the WTRU may send the event-triggered report based on detecting the change in availability and/or unavailability since a last periodic report. The WTRU may send the event-triggered report if the proportion of resources changed is above a configured threshold.

A WTRU may send an event-triggered report based on detecting a change in RSRP/RSSI measured in reported available resources since a last report. The WTRU may send the event-triggered report if the change in RSRP/RSSI measured is above or below a threshold. A WTRU may send an event-trigger report based on detecting that a sensing pool has changed. A WTRU may send an event-trigger report based on detecting that a number of activated carriers has been changed.

A WTRU may be configured to initiate event-triggered sensing reports (e.g., following periodic reports) when a number of resources that have changed from available to unavailable is larger than a threshold. A WTRU may be configured to initiate event-triggered sensing reports (e.g., following periodic reports) when RSRP/RSSI of the resources is above a threshold. A WTRU may be configured to initiate event-triggered sensing reports (e.g., following periodic reports) when a percentage of available resources in a window for reporting at time T+n is above a threshold percentage.

A WTRU may be configured to send an event-triggered report via RRC or MAC CE. For example, a periodic report may be transmitted using an RRC message, and/or event-triggered reporting may be transmitted by a MAC CE. For example, the event-triggered report may be sent with SL-BSR or a similar message. An event-triggered report may be part of the SL-BSR. For example, the event-triggered report may be part of the SL-BSR to inform a network of updated information about a sensing resource in MAC CE under limited MAC CE message size. The size (e.g., in bits) of RRC-based reporting may be much larger than that of MAC CE based reporting. Thus, delta reporting using MAC signaling may utilize less information bits than the original RRC reporting message (e.g., the periodic report).

A time and frequency region for reporting, e.g. in both periodic and event-triggered reports, may be configured (e.g., pre-configured) by a network via RRC signaling. A WTRU may be configured (e.g., pre-configured) to report a sensing region in a delta report. For example, the WTRU may report the sensing region to support a network in decoding the delta report correctly. The WTRU may be configured with a rule to map one bit in a delta report to a resource which was indicated as available (e.g., bit set to 1) in a last periodic report. For example, the WTRU may be configured to scan in subframes from high to low frequency to indicate a difference between a last periodic report and a current delta report of available resources in the last periodic report. The WTRU may scan each subframe sequentially. Bits (e.g., each bit) in a delta report may indicate whether a resource which was indicated as available in an RRC report is still available or not at the time of transmission of the event-triggered report.

Figure 8:
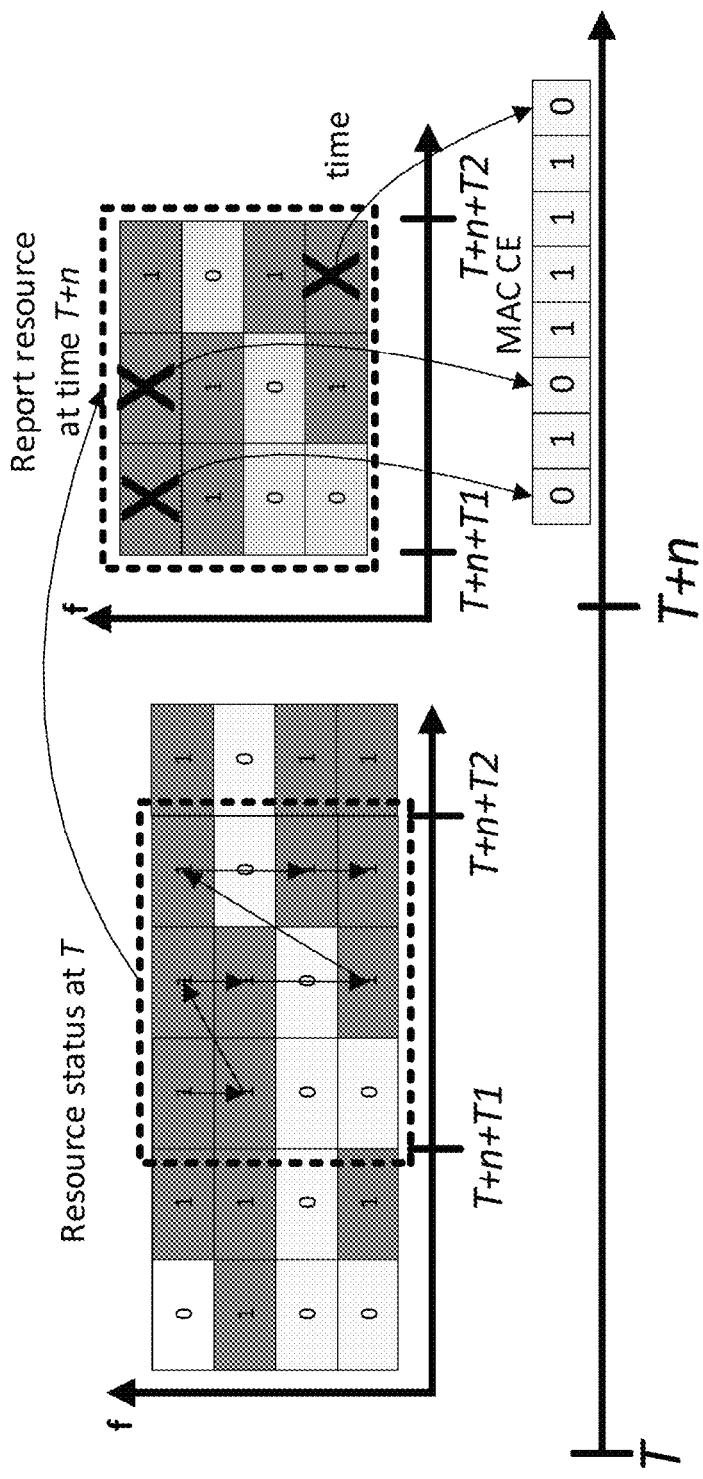
FIG. 8 shows an example of periodic and event-triggered reporting.

FIG. 8 shows an example combination of periodic and event-triggered reporting. As shown in FIG. 8, a WTRU may perform (e.g., one) RRC-based periodic reporting at time T. In a report bitmap shown in FIG. 8, bit 1 may indicate that a resource is available, and bit 0 may indicate otherwise. At time T+n the WTRU may send a sensing report via a MAC CE. Time T+n may be a time when the WTRU is configured to perform buffer status reporting. The WTRU may be configured to send an updated status of resource that was available in a last periodic report in a time window [T+n+T1, T+n+T2]. In a delta report, bit 1 may indicate that a resource is still available, and bit 0 may indicate otherwise. In this manner, each bit in a bitmap for the event-triggered report may correspond to a resource previously indicated as available in a prior sent periodic report. The bitmap may not include update bits for resources previously indicated as unavailable. Such a scheme may allow for smaller sized event-trigger reports by updating the status of previously available resources while not updating the status of resources previously indicated as unavailable.

In an example, each bit in a bitmap for the event-triggered report may correspond to a resource previously indicated as unavailable in a prior sent periodic report. The bitmap may not including update bits for resources previously indicated as available. Such a scheme may allow for smaller sized event-trigger reports by updating the status of previously unavailable resources while not updating the status of resources previously indicated as available.

A WTRU may report an index of a resource that has changed status in an event-triggered report. For example, the wTRU may report the index of a resource that has gone from available in a periodic report to unavailable at the time of an event triggering. The index may be based on or indexed based on, for example, the size of a time/frequency grid configured in the WTRU for reporting.

The WTRU may be configured to report event-triggered sensing results in one or more of the formats described herein. For example, the WTRU may choose a format with the lowest overhead inside.

A WTRU may be configured to determine to perform reporting based on a comparison of the sensing results of the current evaluation with the sensing result of a previous reporting. For example, a WTRU may be configured to transmit either periodic or event-triggered reporting for the current sensing evaluation event, which may be transmitted via one or more RRC messages (e.g., a UEAssistantInformation or MeasurementReport RRC message). The result of the current sensing evaluation event may be configured to be transmitted via periodic and/or event-triggered reporting. The WTRU may be configured to perform reporting when the WTRU detects a possible collision with its configured SPS resources.

The WTRU may be configured to perform reporting when the WTRU detects a difference between a set of available/unavailable resources in a previous reporting compared with the current result of the evaluation of the sensing result event. The difference may consist of a set of unavailable resources in the previous report becoming available or a set of available resource in the previous report becoming unavailable.

A WTRU may be configured to skip transmitting a sensing result if the configured SPS resource is included in the set of available resources. A WTRU may be configured to skip transmitting a sensing result if no available resource in the previous report becomes unavailable, or the number of available resources in the previous report that become unavailable is smaller than a value X or smaller than Y % of the total available resources. The values of X and/or Y may be configured or determined by the WTRU.

Conditions may occur whereby a WTRU may not transmit an event-triggered report. A WTRU may be configured to not transmit an event-triggered report where it would otherwise do so when one or more of the following conditions are met. For example, the WTRU may not sent an event trigger report (even if a triggering event is detected) when the WTRU has changed its sensing pool configuration since a last periodic report. For example, the WTRU may not sent an event trigger report (even if a triggering event is detected) when the WTRU has changed its bandwidth part configuration since the previous periodic report. For example, the WTRU may not sent an event trigger report (even if a triggering event is detected) when the WTRU transmission configuration has changed since the last periodic report.

A WTRU may use a PPPP value when determining availability. A WTRU may be configured to determine availability and/or unavailability of resources for reporting to a network. The available/unavailable status of a resource may depend on a PPPP value. The WTRU may perform resource selection to determine availability and/or unavailability of the resources. For example, the WTRU may select a resource based on sensing of LTE V2x. The WTRU may use a PPPP value of a pending packet. For example, the WTRU may use a PPPP value of a pending packet when data is available to perform resource selection. The PPPP value may not be available when the WTRU performs resource selection for a periodic report. The WTRU may use a lowest PPPP value, a preconfigured or hardcoded value, or a value configured by RRC/SIB, e.g. if the PPPP value is not available. The lowest PPPP value may be associated with a highest priority. The WTRU may use multiple PPPP values to report multiple bitmaps.

A bitmap (e.g., each bitmap) may correspond to a PPPP value. If the PPPP value for a packet to be transmitted was not available when the last periodic report was sent but then becomes available for the event-triggered report, the PPPP value may be considered when generating the event-triggered report. For example, the PPPP value for the packet to be transmitted may not be available if the packet is not yet in a transmission buffer. The PPPP value may be changed if a different PPPP value was assumed for the periodic report. The availability of a PPPP value for a packet to be transmitted may be a trigger for sending an event-triggered report. For example, the event-triggered report may be used to inform the network about availability changes in view of the available PPPP information.

A WTRU operating in a network-scheduled mode may be configured to perform SL resource reservation when triggered by UL BSR transmission. A network-scheduled WTRU may be triggered to send a sensing report along with sidelink BSR. The WTRU may indicate intended or preferred resources in the sensing report for the associated side link transmission. The WTRU may select the intended resource based on the sensing result and may indicate the intended resource to a network.

A network may schedule a resource for a WTRU using the sensing report of another WTRU. The network may use the sensing report of one or more WTRUs to schedule a transmission resource for another WTRU. For example, the network may use the sensing report to schedule the transmission for another WTRU to reduce the number of WTRUs performing sensing and/or reporting. For example, the network may combine the sensing result of one or more WTRUs in the same zone ID. The network may combine the sensing result of one or more WTRUs in the same zone ID to schedule the transmission resource for another WTRU in the same zone as the reporting WTRUs. The WTRU may report its position information to support the network in resource scheduling. For example, the position information may be a zone ID or geolocation.

A WTRU operating in an autonomous-scheduled mode may perform one or more actions as disclosed herein. For example, the WTRU may perform autonomous-scheduled sensing and reporting. A WTRU operating in the autonomous-scheduled mode may report a reserved resource and/or an available or occupied resource.

An autonomous-scheduled WTRU may perform sensing and may determine a set of resources that are reserved. The resources may be reserved by other WTRUs. The WTRU may report to the network the set of resources that are reserved along with forward booking resource for the reporting WTRU. For example, the WTRU may report the reserved resources and/or the forward booking resource to allow the network to identify the resource usage of the autonomous-scheduled WTRUs.

An autonomous-scheduled WTRU may report to the network about one or more avoided resources that are avoided for a period of time T. The value of T may be preconfigured. The value of T may be configured within $[T_1, T_2]$, where $T_1$ and $T_2$ may be preconfigured or configured via RRC dedicated or SIB. The WTRU may determine the exact value of T For example, the WTRU may determine the value of T based on the radio activity of the resource pool. The avoided resource may be occupied by a network-scheduled WTRU or an autonomous-scheduled WTRU. The network may avoid or stop scheduling the resource for the WTRU. For example, the WTRU may avoid or stop scheduling the resource based on the reports of the WTRUs. For example, the WTRU may avoid or stop scheduling the resource if the resource is occupied by the autonomous-scheduled WTRU. The network may continue to schedule the resource for the WTRU. For example the network may continue to schedule the resource for the WTRU if the resource was occupied by the network-scheduled WTRU.

A autonomous-scheduled WTRU (e.g., a WTRU operating in the autonomous-scheduled mode) may report a set of available resources based on sensing. For example, the WTRU may report the available resources following resource selection. The set of available resources may be determined as a set of resources that a PHY layer sends to an upper layer for resource selection. A set of resources selected by the WTRU for transmission may be excluded from the set of available resources. The set of available resources may be reported to a network. For example, the set of available resources may be reported by a RRC message. The autonomous-scheduled WTRU may be configured to report a subset of resources that it determines as available using a resource selection implementation. For example, the WTRU may be configured to report only the subset of resources. The WTRU may determine the subset of resources based on lowest RSSI or based on a configured time/frequency window.

A WTRU may indicate the PPPP of a packet to be transmitted in a report. For example, the WTRU may use the PPPP of the packet to perform resource selection and determine availability information.

An autonomous-scheduled WTRU may avoid the reserved resource of a network-scheduled WTRU (e.g., a WTRU operating in a network-scheduling mode) when the network-scheduled WTRU transmits SCI without data. A network-scheduled WTRU may send the SCI in the side link without data, but with a BSR/sensing report UL transmission as a timing reference. The duration between the BSR/sensing report UL transmission and the SCI SL transmission without any data may be configured (e.g., pre-configured) and indicated to the WTRU via system broadcast and/or RRC signaling. In the SCI, the WTRU may indicate an intended or preferred data transmission resource including the timing information. For example, the timing information may be the timing offset between the SCI and SL data transmissions. The intended transmission may contain data only, or both SCI and data. This may reduce resource collision of the network scheduled WTRU for a one time transmission or a dynamic transmission.

An autonomous-scheduled WTRU may be configured to perform resource selection (e.g., reselection). As used herein, the term "resource selection" may also refer to resource reselection. An autonomous-scheduled WTRU may trigger resource selection based on the detection of a potential collision. A WTRU may perform resource reselection based on the detection of a potential collision. An autonomous-scheduled WTRU may trigger resource selection or reselection for its forward booking transmission. For example, the autonomous-scheduled WTRU may trigger resource selection or resource reselection when it determines that its reserved resource for the forward booking transmission may collide with a network-scheduled transmission. For example, an autonomous scheduled WTRU may receive an SCI that indicates that the network is scheduling a network-scheduled WTRU on a resource that the autonomous-scheduled WTRU had previously reserved via a forward booking.

The WTRU may trigger resource selection or reselection for its forward booking transmission. For example, the WTRU may trigger resource selection or reselection for its forward booking transmission when one or more of the following criteria are met. The WTRU may trigger resource selection or reselection for its forward booking transmission when the PSSCH resource for a network-scheduled packet overlaps with the reserved resource for forward booking transmission. The WTRU may trigger resource selection or reselection for its forward booking transmission when the measured RSRP or RSSI of the PSSCH resource for the network-scheduled packet is greater than a configured threshold value. The WTRU may obtain the information of the PSSCH resource for the network-scheduled packet by decoding its SCI. The value of the threshold to determine the collision may depend on the relative priority between a transmit packet and the received packet. For example, a relatively lower threshold may be used when the packet of the other WTRU is of relative higher priority. A relatively higher threshold may be used when the packet of the other WTRU is of relative lower priority.

Autonomous-scheduled WTRUs may be configured to avoid the network broadcast reserved resource of a network-scheduled WTRU. An autonomous scheduled WTRU may receive a broadcast message from a network indicating a set of reserved or occupied resources. For example, the WTRU may receive a broadcast message about the availability of the resource by decoding a DCI associated with a group RNTI. The DCI associated with the group RNTI may schedule a PDSCH having the reserved resource information. The autonomous-scheduled WTRU may trigger the resource selection. For example, the autonomous-scheduled WTRU may trigger the resource selection when the resource reserved by the network overlaps with one of the WTRU's forward booking resources. During resource selection, the WTRU may avoid the resources reserved by the network. For example, the WTRU may avoid the resources reserved by the network by marking them as unavailable.

An autonomous-scheduled WTRU may be configured to avoid resources used by a network-scheduled WTRU by decoding the SCI of the network-scheduled WTRU. An autonomous-scheduled WTRU may be configured to avoid a resource for network scheduled transmission for a period of time T after it has detected a network scheduled transmission on the resource. For example, T may be measured in subframes or slots. The WTRU may determine the presence of a network scheduled transmission based on an indication in the SCI. The indication may be, for example, a network-scheduled or autonomous-scheduled indicator. The indication may be an explicit indication. The value of T may be preconfigured or configured by the network. For example, the value of T may be preconfigured or configured by RRC or broadcast SI. The network may schedule the same resource for a WTRU before the period T has expired. For example, the network may schedule the same resource for a WTRU before the period T has expired because the probability of collision is reduced.

A WTRU may be configured to avoid a resource in time $t+k*t\_reserved$, where $k=1, 2, \ldots, K$. For example, the WTRU may be configured to avoid the resource in time $t+k*t\_reserved$ when the WTRU decodes a network scheduled transmission via SCI at time t. The WTRU may determine a network scheduled transmission by decoding SCI of the transmission. The SCI may contain the mode indicator, or a pattern and/or a set of bits, which may implicitly indicate the mode of transmission. The value of K may indicate the number of reserved transmissions associated with a network-scheduled transmission. $t\_reserved$ may denote an interval between a network-scheduled transmission and a reserved transmission. The value of K may be preconfigured. The value of $t\_reserved$ may be indicated in the SCI of the decoded network scheduled packet. This may allow the autonomous-scheduled WTRU to avoid the network-scheduled transmission in K periods. For example, the autonomous-scheduled WTRU may avoid the network-scheduled transmission even if the autonomous-scheduled WTRU could not decode the corresponding future network scheduled transmission in the subframe(s) indicated by $t\_reserved$.

A WTRU may be configured to prioritize network-scheduled transmissions over WTRU autonomous transmissions. An autonomous-scheduled WTRU may be configured to reduce resource collision during a resource selection time. The autonomous-scheduled WTRU may be configured to exclude the resources occupied by the network-scheduled WTRU during the resource selection time. For example, all resources occupied by the network-scheduled WTRU during the resource selection time may be excluded. Excluding resources occupied by the network-scheduled WTRU during the resource selection time may allow the network-scheduled transmission to have the highest priority.

An autonomous-scheduled WTRU (e.g., a WTRU operating in an autonomous-scheduled mode) may be configured to increase the relative priority of a network-scheduled transmission during resource selection (e.g., reselection). Increasing the relative priority of the network-scheduled transmission may balance the priority of a packet to be transmitted by the WTRU and the priority of the network-scheduled transmission.

The WTRU may select a first resource for transmission of a packet. The WTRU may transmit a first resource reservation message after selecting the first resource. The first resource reservation message may be sent via first SCI. The first resource reservation message may indicate a forward booking of the first resource. The WTRU may select the first resource from a resource pool that may be configured to be shared by WTRUs that are configured to operate in a first sidelink scheduling mode (e.g., mode 3 or network-scheduled) and WTRUs that are configured to operate in a second sidelink scheduling mode (e.g., mode 4 or autonomous-scheduled). For example, the resource pool may include one or more resources reserved by WTRUs operating using the first sidelink scheduling mode and one or more resources reserved by WTRUs operating using the second sidelink scheduling mode.

The WTRU may determine that the first resource is reserved for a sidelink transmission scheduled by another WTRU via the first sidelink scheduling mode. For example, the WTRU may detect a potential collision between transmission of the packet and the sidelink transmission scheduled by the other WTRU. The WTRU may determine that the first resource is reserved for the sidelink transmission based on decoding second SCI. For example, the second SCI may include an indication that the first resource is reserved for the sidelink transmission. The indication may be an explicit indication. The WTRU may determine that the first resource is reserved for the sidelink transmission based on comparing an RSRP of the first resource to a threshold. For example, the WTRU may determine that the first resource is reserved for the sidelink transmission if the RSRP is above the threshold.

The WTRU may evaluate the availability of one or more resources in the resource pool. For example, when determining the availability of a resource, an autonomous-scheduled WTRU may determine a resource to be occupied or available. The WTRU may determine that the resource is occupied or available based on the RSRP of the resource being above or below a threshold. The WTRU may receive SCI for the resource and decode the SCI. The SCI may indicate a priority (e.g., a received priority) of a transmission using the resource. The WTRU may have data to transmit, which may have a priority (e.g., a transmit priority). The threshold may be determined based on the received priority and/or the transmit priority. For example, the network and/or pre-configuration may configure a different threshold for pairs (e.g., each pair) of received priority and transmit priority. The received priority may be determined based on the decoded SCI. The transmit priority may be based on the data the WTRU intends to transmit in the selected resources.

There may be one or more (e.g., two) thresholds used to determine availability of resources in the resource pool. For example, there may be a first threshold used to determine availability of resources reserved by WTRUs operating in the first sidelink mode (e.g., network-scheduled) and a second threshold used to determine availability of resources reserved by WTRUs operating in the second sidelink mode (e.g., autonomous-scheduled). The second threshold may be referred to as Threshold_RX_TX. The WTRU may determine the availability of a resource in the resource pool by comparing a measurement associated with the resource to the first threshold or the second threshold. For example, an RSRP of the resource may be compared to the first threshold or the second threshold. A resource reserved by a WTRU operating in the first sidelink mode may be considered available if an RSRP of the resource is lower than the first threshold. A resource reserved by a WTRU operating in the second sidelink mode may be considered available if an RSRP of the resource is lower than the second threshold.

The WTRU may be configured to determine the first threshold based on the second threshold. For example, the WTRU may apply a delta to Threshold_RX_TX to determine the first threshold. The WTRU may use Threshold_RX_TX when a decoded SCI indicates an autonomous-scheduled transmission on a resource in the resource pool. The WTRU may determine the relative threshold for network-scheduled transmissions as Threshold_RX_TX+delta, where delta may be an offset value to control the relative priority between network scheduled and autonomous scheduled transmissions. The first threshold may be lower than the second threshold. For example, delta may be a negative value, and the first threshold may be determined by adding delta to Threshold_RX_TX. delta may be a negative value, and the first threshold may be determined by subtracting delta from Threshold_RX_TX (e.g., Threshold_RX_TX-delta). The value of delta may be preconfigured. Different values of Threshold_RX_TX may be preconfigured. The WTRU may be configured by the network or pre-configured to apply a different set of thresholds associated with TX and RX priority. For example, different thresholds may be used depending on whether the decoded transmission is a network-scheduled transmission or a WTRU autonomous transmission.

The WTRU may select a second resource based on the determined availabilities of the resources in the resource pool. For example, the WTRU may reselect to the second resource. The WTRU may transmit a second resource reservation message after selecting the second resource. The second resource reservation message may be sent via second SCI. The second resource reservation message may indicate a forward booking of the second resource. The WTRU may use the second resource to transmit the packet.

A WTRU may be configured to perform dynamic mode selection. A WTRU within coverage of a network may be configured to dynamically choose its scheduling mode to reduce resource collision. The WTRU may determine whether to work in network-scheduled mode or autonomous-scheduled mode for a packet transmission based on one or more of the following criteria. The WTRU may determine whether to work in network-scheduled mode or autonomous-scheduled mode for a packet transmission based on the QoS of the packet. For example, the QoS of the packet may be determined based one or more of the packet priority, reliability and/or latency requirement. The WTRU may determine whether to work in network-scheduled mode or autonomous-scheduled mode for a packet transmission based on the radio activity of the resource pool. For example, the radio activity of the resource pool may be determined based on a CBR measurement and/or an optional configured threshold. The WTRU may determine whether to work in network-scheduled mode or autonomous-scheduled mode for a packet transmission based on available sensing information. The WTRU may determine whether to work in network-scheduled mode or autonomous-scheduled mode for a packet transmission based on the sensing capability of the WTRU. The WTRU may report the determined scheduling mode and/or its information of its autonomous-scheduling mode to the network, for example its resource usage and CBR of the resource pool. The WTRU reporting the scheduling mode and/or information may support the network in controlling resource utilization efficiently. A WTRU with low sensing capability or no sensing capability may be configured to operate in network-scheduled mode only.

A WTRU may be configured to determine a scheduling mode for the WTRU based on available sensing information. The WTRU may determine to operate in network-scheduling mode. For example, the WTRU may determine to operate in network-scheduling mode if the WTRU does not have enough sensing information to perform resource selection by itself. The WTRU may determine that it does not have enough sensing information based on one or more of the following. The WTRU may determine that it does not have enough sensing information if the WTRU's sensing time is less than a threshold. For example, the threshold may be pre-configured. The WTRU may determine that it does not have enough sensing information if the sensing resource is not sufficient to perform resource selection. The WTRU may determine to operate in autonomous-scheduled mode if it has enough sensing information for a potential transmission resource.

A WTRU may be configured to determine a scheduling mode based on a packet QoS. The WTRU may determine to operate in network-scheduled mode based on the packet QoS. For example, the WTRU may determine to operate in network-scheduled mode if the packet requires high reliability. Selecting the network-scheduled mode may reduce resource collision. For example, selecting the network-scheduled mode may reduce resource collision if the network has more sensing information than the WTRU. The network may have more sensing information compared to the WTRU from receiving multiple reports. The WTRU may indicate a high reliability transmission to the eNB. For example, the WTRU may indicate a high reliability transmission to the eNB by sending a BSR report containing the logical channel group (LCG) associated with a high PPPR/PPPP value. The WTRU may indicate a high reliability transmission to request scheduling of additional resources and/or configurations that may not be available in WTRU autonomous transmission. For example, the WTRU may indicate that a transmission is a high reliability transmission if the transmission uses a large bandwidth, a high order of transmission diversity, more transmission power, etc.

A WTRU may be configured to determine a scheduling mode based on radio activity. A WTRU may determine to operate in autonomous-scheduled mode if the measured radio activity is less than a threshold. The measured radio activity may be the CBR of the transmit resource pool. A WTRU may determine to operate in network-scheduled mode if the measured radio activity is greater than the threshold. Determining a scheduling mode based on radio activity may be performed because the network may have higher capability of avoiding resource collision in scheduling than a WTRU does. The WTRU may determine to operate in network-scheduled mode when CBR is high enough to avoid resource collision. For example, the WTRU may determine to operate in network-scheduled mode if the QoS of the packet is guaranteed.

The WTRU may determine to operate in network-scheduled mode in one carrier component and operate in autonomous-scheduled mode in another carrier component. The selection of a scheduling mode in each carrier component may be determined by the radio activity of each carrier component.

A WTRU may be configured to determine a scheduling mode based on sensing and collision detection. A WTRU may determine to switch from network-scheduled mode to autonomous-scheduled mode and/or send a report about its decision to a network. For example, the WTRU may determine to switch from network-scheduled mode to autonomous-scheduled mode and/or send a report about its decision to the network if it detects that the scheduled resource may result in resource collision with another transmission from another WTRU. For example, the WTRU may detect that the scheduled resource may result in resource collision with another transmission from another WTRU based on the sensing result. The WTRU may perform resource selection or drop the packet. For example, the WTRU may perform resource selection or drop the packet depending on the latency requirement of the packet.

The WTRU may be configured to determine a scheduling mode based on information sent from another WTRU. For example, the WTRU may determine to switch from the network-scheduled mode to the autonomous-scheduled mode if it receives feedback from a WTRU that requiring a retransmission for a packet transmitted before. For example, the feedback may be an ACK/NACK feedback(s) of the previous transmission for unicast/groupcast. Determining a scheduling mode based on information sent from another WTRU may allow the WTRU to work in a unicast or groupcast scenario.

Figure 9:
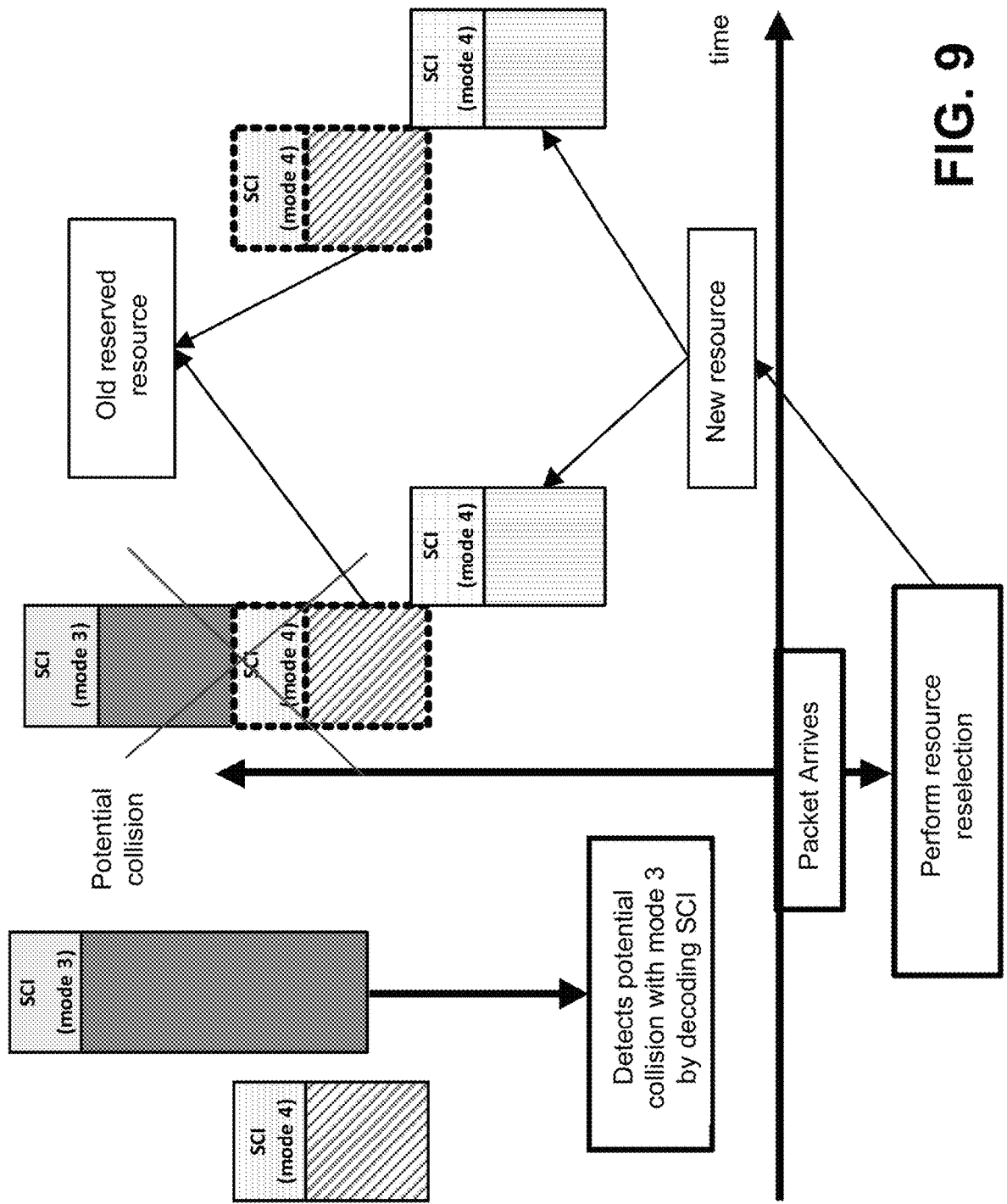
FIG. 9 shows an example of a WTRU operating in an autonomous-scheduled mode performing resource reselection when it detects a potential collision with a transmission scheduled via network scheduling.

FIG. 9 shows an example of an autonomous-scheduled WTRU performing resource reselection when it detects a potential collision with a network-scheduled transmission. An autonomous-scheduled WTRU may detect a potential collision with a transmission of a network-scheduled WTRU, for example by decoding SCI. A packet may arrive at the autonomous-scheduled WTRU. The autonomous-scheduled WTRU may perform resource reselection and/or reservation for the data in the buffer. If the traffic is periodic, the WTRU may perform resource reselection and reservation. Otherwise, the WTRU may perform resource reselection without performing reservation. The autonomous-scheduled WTRU may use the new resource to transmit the packet.

Figure 10:
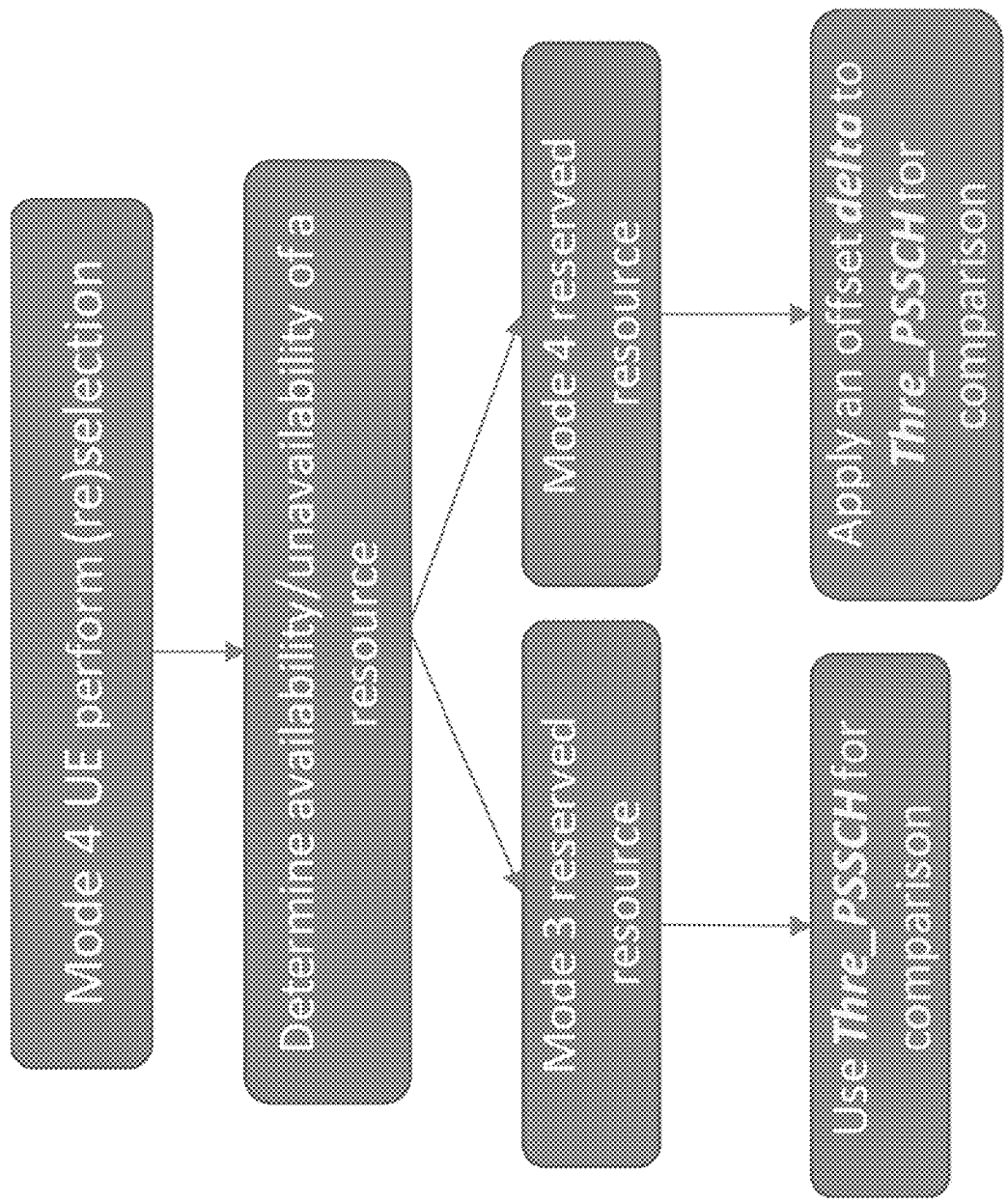
FIG. 10 shows an example of a WTRU operating in mode an autonomous-scheduled increasing the priority of a transmission scheduled via network scheduling during resource selection (e.g., reselection).

FIG. 10 shows an example of an autonomous-scheduled WTRU (e.g., a WTRU operating in an autonomous-scheduled mode) increasing the priority of a network-scheduled transmission during resource selection. The example shown in FIG. 10 may be used after the WTRU has selected a first resource and determined that the first resource is unavailable. For example, the WTRU may determine that the first resource is unavailable if the first resource is reserved for a sidelink transmission scheduled via network scheduling. As shown in FIG. 10, the WTRU may select a second resource (e.g., reselect to the second resource). The WTRU may select the second resource from a resource pool. As shown in FIG. 10, the WTRU may determine the availability and/or unavailability of the resources in the resource pool. The WTRU may determine the availability of resources in the resource pool that are reserved for WTRUs operating in a network scheduling mode using a first threshold. For example, the RSRP (e.g., RSRP_PSSCH) of the resources reserved for WTRUs operating in the network-scheduling mode may be compared to the first threshold. A resource reserved for WTRUs operating in the network-scheduling mode may be determined to be available if the RSRP for the resource is below the first threshold. The resource reserved for WTRUs operating in the network-scheduling mode may be determined to be unavailable if the RSRP for the resource is greater or equal to the first threshold.

The WTRU may determine the availability of resources in the resource pool that are reserved for WTRUs operating in the autonomous-scheduled mode may be determined using a second threshold (e.g., Thre_PSSCH). The second threshold may be higher than the first threshold. For example, the RSRP (e.g., RSRP_PSSCH) of the resources reserved for WTRUs operating in the autonomous-scheduled mode may be compared to the second threshold. A resource reserved for WTRUs operating in the autonomous-scheduled mode may be determined to be available if the RSRP for the resource is below the second threshold. The resource reserved for WTRUs operating in the autonomous-scheduled mode may be determined to be unavailable if the RSRP for the resource is greater or equal the second threshold.

The second threshold may be referred to as Thre_PSSCH. The value of Thre_PSSCH may be configured (e.g., pre-configured), determined by the WTRU, and/or received from another WTRU and/or the network. The value of the first threshold may be determined based on Thre_PSSCH and an offset value. The offset value may be referred to as delta. delta may be a positive value, and may be subtracted from Thre_PSSCH to determine the value of the first threshold. delta may be a negative value, and may be added to Thre_PSSCH to determine the value of the first threshold. The first threshold may be lower than the second threshold in order to prioritize network-scheduled transmissions over autonomous-scheduled transmissions. The WTRU may select the second resource (e.g., reselect to the second resource) based on the availability of the resources in the resource pool.

What is claimed is:

1. A method implemented in a wireless transmit/receive unit (WTRU), the method comprising:
   selecting a first resource from a resource pool, wherein the first resource is associated with a first sidelink scheduling mode, and wherein the first resource is selected based on a scheduling indication;
   transmitting a first resource reservation message, wherein the first resource reservation message indicates that the first resource is reserved;
   selecting a second resource from the resource pool, wherein the second resource is associated with a second sidelink scheduling mode;
   transmitting a second resource reservation message, wherein the second resource reservation message indicates that the second resource is reserved;
   determining whether the second resource from the resource pool overlaps with the first resource from the resource pool
   based on the determination that the second resource from the resource pool overlaps with the first resource from the resource pool, evaluating availability of resources in the resource pool, wherein:
   availability of the first resource in the resource pool is determined based on a comparison of a first measurement to a first threshold, and
   availability of the second resource in the resource pool is determined based on a comparison of a second measurement to a second threshold;
   re-selecting at least one of the first resource or the second resource from the resource pool based on the evaluated availability of resources; and
   re-transmitting at least one of the first resource reservation message or the second resource reservation message based on the re-selection.

2. The method of claim 1, wherein the second resource reservation message indicates a forward booking of the second resource.

3. The method of claim 1, wherein transmitting the first resource reservation message comprises transmitting the first resource reservation message via first sidelink control information (SCI), and wherein transmitting the second resource reservation message comprises transmitting the second resource reservation message via second SCI.

4. The method of claim 1, wherein the second measurement is a second reference signal received power (RSRP) measurement associated with the second resource, and wherein the second resource is considered available if the second RSRP measurement is less than the second threshold.

5. The method of claim 1, wherein the first measurement is a first RSRP measurement associated with the first resource, and wherein the first resource is considered available if the first RSRP measurement is less than the first threshold.

6. The method of claim 1, wherein the first threshold is determined based on the second threshold and an offset value, and wherein the first threshold is lower than the second threshold.

7. The method of claim 1, wherein the scheduling indication is received via SCI, and the SCI comprises an indication indicating that the SCI corresponds to the first sidelink scheduling mode.

8. The method of claim 1, wherein the method comprises:
   reserving the first resource associated with the first sidelink scheduling mode for a sidelink transmission if a comparison of a reference signal received power (RSRP) measurement associated with the first resource is above a third threshold.

9. The method of claim 1, wherein the method is implemented by the WTRU operating in the second sidelink scheduling mode.

10. The method of claim 1, wherein the WTRU is a first WTRU, and the scheduling indication is received from at least one of a network or a second WTRU.

11. The method of claim 1, the method comprises:
    re-selecting at least one of the first resource or the second resource from the resource pool such that the first resource and the second resource avoid a collision.

12. A wireless transmit/receive unit (WTRU) comprising:
    a processor configured to:
    select a first resource from a resource pool, wherein the first resource is associated with a first sidelink scheduling mode, and wherein the first resource is selected based on a scheduling indication;
    transmit a first resource reservation message wherein the first resource reservation message indicates that the first resource is reserved;
    select a second resource from the resource pool, wherein the second resource is associated with a second sidelink scheduling mode;

transmit a second resource reservation message, wherein the second resource reservation message indicates that the second resource is reserved;

determine whether the second resource from the resource pool overlaps with the first resource from the resource pool;

based on the determination that the second resource from the resource pool overlaps with the first resource from the resource pool, evaluate availability of resources in the resource pool, wherein:
- availability of the first resource in the resource pool is determined based on a comparison of a first measurement to a first threshold, and
- availability of the second resource in the resource pool is determined based on a comparison of a second measurement to a second threshold;

re-select at least one of the first resource or the second resource from the resource pool based on the evaluated availability of resources; and re-transmit at least one of the first resource reservation message or the second resource reservation message.

13. The WTRU of claim 12, wherein the second resource reservation message indicates a forward booking of the second resource.

14. The WTRU of claim 12, wherein the first resource reservation message is transmitted via first sidelink control information (SCI), and the second resource reservation message is transmitted via second SCI.

15. The WTRU of claim 12, wherein the second measurement is a second reference signal received power (RSRP) measurement associated with the second resource, and wherein the second resource is considered available if the second RSRP measurement is less than the second threshold.

16. The WTRU of claim 12, wherein the first measurement is a first RSRP measurement associated with the first resource, and wherein the first resource is considered available if the first RSRP measurement is less than the first threshold.

17. The WTRU of claim 12, wherein the first threshold is determined based on the second threshold and an offset value, and the first threshold is lower than the second threshold.

18. The WTRU of claim 12, wherein the scheduling indication is received via sidelink control information (SCI).

19. The WTRU of claim 12, wherein the WTRU is a first WTRU, and the scheduling indication is received from at least one of a network or a second WTRU.

20. The WTRU of claim 12, wherein the processor is configured to:
- re-reselect at least one of the first resource or the second resource from the resource pool such that the first resource and the second resource avoid a collision.

* * * * *